US009731344B2

(12) United States Patent
Chowdhary

(10) Patent No.: US 9,731,344 B2
(45) Date of Patent: Aug. 15, 2017

(54) COMPUTER IMPLEMENTED SYSTEMS AND METHODS FOR OPTIMIZATION OF SAND FOR REDUCING CASTING REJECTIONS

(71) Applicant: Deepak Chowdhary, Nagpur (IN)

(72) Inventor: Deepak Chowdhary, Nagpur (IN)

( * ) Notice: Subject to any disclaimer, the term of this patent is extended or adjusted under 35 U.S.C. 154(b) by 26 days.

(21) Appl. No.: 14/653,282

(22) PCT Filed: Feb. 26, 2014

(86) PCT No.: PCT/IN2014/000128
§ 371 (c)(1),
(2) Date: Jun. 18, 2015

(87) PCT Pub. No.: WO2014/132269
PCT Pub. Date: Sep. 4, 2014

(65) Prior Publication Data
US 2016/0001355 A1   Jan. 7, 2016

(30) Foreign Application Priority Data
Feb. 26, 2013   (IN) .......................... 553/MUM/2013

(51) Int. Cl.
*B22C 19/04*   (2006.01)
*G05B 19/418*   (2006.01)

(52) U.S. Cl.
CPC .......... *B22C 19/04* (2013.01); *G05B 19/4188* (2013.01); *G05B 2219/35044* (2013.01)

(58) Field of Classification Search
CPC ................ B22C 19/04; G05B 19/4188; G05B 2219/35044
(Continued)

(56) References Cited

U.S. PATENT DOCUMENTS

| 2,756,476 A * | 7/1956 | Moore ...................... B22C 1/00 106/38.9 |
| 2002/0156542 A1 * | 10/2002 | Nandi .................. G05B 13/042 700/30 |
| 2012/0232685 A1 * | 9/2012 | Wang .................. G06F 17/5018 700/98 |

FOREIGN PATENT DOCUMENTS

| EP | 0 968 777 | 1/2000 |
| JP | 2006 341265 | 12/2006 |

OTHER PUBLICATIONS

Karunakar et al: "Controlling green sand mould properties using artificial neural networks and genetic algorithms—A comparison", Applied Clay Science, Elsevier Science, NL, vol. 37, No. 1-2, Jan. 16, 2007 (Jan. 16, 2007), pp. 58-66, XP022100938, ISSN: 0169-1317, DOI: 10.1016/J. Clay. 2006.11.005 pp. 58-66.
(Continued)

*Primary Examiner* — Kenneth M Lo
*Assistant Examiner* — Yuhui R Pan
(74) *Attorney, Agent, or Firm* — Sand & Sebolt

(57) ABSTRACT

A computer implemented system for optimization of sand for reducing casting rejections in a foundry utilizing the existing foundry components or machinery. The system is accessible online via a computer network. The system is enabled to provide a predicted or prescribed solution for the optimization of sand using at least a parameter relating to the aforementioned sand. Further, the system is enabled to determine the parameters contributing to casting rejections and provide a corresponding solution for reducing the rejections in the next casting batches for the particular foundry. The system includes a user interface module for enabling users to upload foundry related data into the system, a reporting module enabling the user to generate and understand current statistics of the foundry, and a processing engine which enables the system to perform mathematical
(Continued)

computation of user queries and provide the desired predicted or prescribed solution to the user for the foundry.

10 Claims, 26 Drawing Sheets

(58) Field of Classification Search
USPC .......................................................... 700/204
See application file for complete search history.

(56) References Cited

OTHER PUBLICATIONS

Charnnarong Saikaew, Sermsak Wiengwiset: "Optimizing of molding sand composition for quality improvement of iron casting", Applied Clay Science, Elsevier Science, vol. 67-68, Aug. 30, 2012 (Aug. 30, 2012), pp. 26-31, XP002729971, DOI: 10.1016/J. Clay. 2012.07.005 pp. 26-31.

* cited by examiner

645

| Line Name | Component Name | Date From | Date To |
|---|---|---|---|
| Neosym_Line1 | --All-- | | |

650

| Total Sand Rejection Quantity (%) | GCS (gm/cm2) | Compactability (no) | Active Clay (%) | Wet Tensile Strength (gm/cm2) | LOI (%) | Moisture (%) | Inert Fines (%) | Volatile Matter (%) | Permeability (no) | GFN/AFS (no) |
|---|---|---|---|---|---|---|---|---|---|---|
| 0.83 - 1.40 | 1956.00 - 1965.67 | 39.00 - 39.33 | 7.99 - 8.06 | 11.33 - 11.60 | 4.44 - 5.08 | 3.10 - 3.13 | 3.92 - 4.60 | 1.77 - 2.53 | 153.33 - 160.00 | 46.10 - 48.80 |

655

| Date | Total Sand Rejection Quantity (%) |
|---|---|
| 24-Jan-2014 | 0.91 |
| 24-Jan-2014 | 0.91 |
| 20-Jan-2014 | 0.83 |
| 08-Jan-2014 | 1.25 |
| 10-Jan-2014 | 1.27 |
| 17-Jan-2014 | 1.40 |

FIGURE 6(b)

| Line Name | Component Name | Date From | Date To |
|---|---|---|---|
| Neosym_Line1 | --All-- | | |

740

| | Rejections |
|---|---|
| Percentage | 7.56 |
| Confidence Percentage | 87.92 |

745

| GCS (gm/cm2) | Compactability (no) | Active Clay (%) | Wet Tensile Strength (gm/cm2) | LOI (%) | Moisture (%) | Inert Fines (%) | Volatile Matter (%) | Permeability (no) | GFN/AFS (no) |
|---|---|---|---|---|---|---|---|---|---|
| 1923.33 | 39.00 | 8.64 | 10.80 | 5.40 | 3.10 | 5.28 | 2.90 | 170.00 | 48.86 |

| Line Name | Component Name | Date From | Date To |
|---|---|---|---|
| Neosym_Line1 | --All-- | | |

950 →

| | Compactability | GCS | Moisture | Permeability | LOI | Active Clay | Inert Fines | Volatile Matter | Wet Tensile Strength | GFN / AFS |
|---|---|---|---|---|---|---|---|---|---|---|
| Weightage | 4.07 | 3.87 | 3.60 | 2.36 | 2.12 | 0.77 | -0.20 | -0.14 | 0.10 | -0.07 |

| Input | GCS (gm/cm2) | Active Clay (%) | Volatile Matter (%) | Permeability (no) | Inert Fines (%) | Moisture (%) | Compactability (no) | GFN/AFS (no) | Wet Tensile Strength (gm/cm2) | LOI (%) | Total Sand Rejection Quantity (%) |
|---|---|---|---|---|---|---|---|---|---|---|---|
| Predicted From Selected (1) | 1923.33 | 8.64 | 2.9 | 170.0 | 5.28 | 3.1 | 39.0 | 48.86 | 10.8 | 5.4 | 7.56 |
| Optimal Prediction (2) | 1971.24 | 8.24 | 2.80 | 167.40 | 5.13 | 3.10 | 38.99 | 49.18 | 11.41 | 5.07 | 4.84 |
| Difference (2) - (1) | 47.91 | -0.40 | -0.10 | -2.60 | -0.15 | 0.00 | -0.01 | 0.32 | 0.61 | -0.33 | -2.72 |

FIGURE 9(c)

| Input | GCS (gm/cm2) | Volatile Matter (%) | GFN/AFS (no) | Active Clay (%) | Permeability (no) | Inert Fines (%) | Compactability (no) | Moisture (%) | Wet Tensile Strength (gm/cm2) | LOI (%) | Total Sand Rejection Quantity (%) |
|---|---|---|---|---|---|---|---|---|---|---|---|
| Predicted From Selected (1) | 1923.33 | 2.9 | 48.86 | 8.64 | 170.0 | 5.28 | 39.0 | 3.1 | 10.8 | 5.4 | 7.56 |
| Lowest Achieved (2) | 1957.67 | 1.90 | 47.80 | 7.99 | 160.00 | 4.60 | 39.00 | 3.10 | 11.43 | 4.83 | 0.83 |
| Difference (2) - (1) | 34.34 | -1.00 | -1.06 | -0.65 | -10.00 | -0.68 | 0.00 | 0.00 | 0.63 | -0.57 | -6.73 |

COMPUTER IMPLEMENTED SYSTEMS AND METHODS FOR OPTIMIZATION OF SAND FOR REDUCING CASTING REJECTIONS

A computer implemented system and method for optimization of sand for the purpose of reducing casting rejections in a foundry.

FIELD OF THE DISCLOSURE

The present disclosure relates to the field of computing systems. Particularly, the present disclosure relates to providing system to be utilized in a foundry related to casting.

Definitions of Terms Used in the Specification

The expression 'user' used hereinafter in the specification refers to but is not limited to a foundry man, a customer, and an administrator.

The expression 'computer network' used hereinafter in the specification refers to but is not limited to Wide Area Network (WAN), Local Area Network (LAN), Metropolitan Area Network (MAN), Internet, Wireless Local Area Network (WLAN), cellular network and a combination thereof.

The expression 'foundry' used hereinafter in the specification refers to but is not limited to a factory, a workshop, a mill, a manufactory and a plant.

The expression 'Green Compression Strength' (GCS) used hereinafter in the specification refers to but is not limited to the stress required to rupture the sand under compressive load. The GCS is measured on standard specimen 2' ϕ×2" height on Universal Sand testing Machine & is expressed in Gms./sq.cm.

The expression 'compactability' used hereinafter in the specification refers to but is not limited to a property of molding/moulding sand which is of decisive practical importance in establishing their behavior on automated molding/moulding machines. Compactability relates to the percentage decrease of the height from the original constant level of the loose sand under the influence of squeeze compaction. Further, compactability provides an accurate degree of temper water indicator which is practically independent of sand composition.

The expression 'moisture' used hereinafter in the specification refers to but is not limited to the water added to the sand being mixed in mixer along with clay binder to impart GCS to moulding sand.

The expression 'active clay' used hereinafter in the specification refers to but is not limited to portion of clay used as bonding material in moulding sand which provides cohesion between the sand grains and permits ramming to a stable mould. The active clay provides strength and related qualities of deformation toughness and mould hardness.

The expression 'inert fines' used hereinafter in the specification refers to but is not limited to the portion of clay which is inert in properties and does not contribute in either way for bonding of sand grains. Additionally, the inert fines parameter represents the percentage difference between the total clay content and the active clay.

The expression 'Loss of Ignition' (LOI) used hereinafter in the specification refers to but is not limited to sum of material present in the molding/molding sand in form of volatile matter and fixed carbon combustible material in the sand. The LOI is determined by the percentage loss on ignition of the dry sand.

The expression 'permeability' used hereinafter in the specification refers to but is not limited to natural ability of the compacted sand to allow gases to escape to atmosphere. These were generated when a liquid or a pliable raw material is poured into the mold/mould. The permeability is represented in numeric value to specify the rate of flow of air passing through the standard specimen 2' ϕ×2" height under a standard pressure.

The expression 'Wet Tensile Strength' (WTS) used hereinafter in the specification refers to but is not limited to tensile strength of the condensation zone that is created in all clay bonded molds/moulds during and after a liquid or a pliable raw material is poured. WTS is determined by pulling a detachable ring from a special specimen tube. The condensation zone is artificially created by the heating plate on which the specimen face rests. The heating plate heats up the sand at the interface and the temperature radiant is developed through the sand specimen. The steam is pushed away from the heating plate through the permeable sand specimen. The water vapor migrates back into the specimen through a temperature zone for condensation. This condensation zone is known as a wet layer. When the load is applied the specimen breaks at the weakest area/point and measurements are noted. The WTS is expressed in terms of gm/cm sq.

The expression 'Volatile Matter' (VM) used hereinafter in the specification refers to but is not limited to portion of lustrous carbon additive added to the sand mix which volatizes at a temperature between 450 and 920 degree Celsius (° C.). The VM consists of two portions known as lower temperature volatiles and higher temperature volatiles. The product of volatilization gives cushioning effect between the metal to mould interface required for avoiding sand fusion, metal penetration rejections.

The expression 'Grain Fineness Number' (GFN/AFN) used hereinafter in the specification refers to but is not limited to is the measurement of average grain size expressed in micrometers (μm), determined using ISO metric sieves. The average grain size of 100 gm. sample passed through set of sieve from 710 μm-63 μm. The percentages retained on each sieve are weighed and arranged in the descending size of sieve. Each such percentage number is multiplied by the preceding sieve mess number and sum of all these multiplication numbers are divided by the sum of total percentage to give the GFN number. If an AFS sieve set is used then an AFS number of the sand is received in the as the output.

The expression 'pH value' used hereinafter in the specification refers to but is not limited to the indication of acid/alkaline nature of the moulding sand. pH value is a measurement of ability of moulding sand having acid/alkaline property due to addition of bonding material such as Bentonite. pH value below number 7 indicates acidic nature and above 7 indicates alkaline nature of the moulding sand. The pH control has no effect on the properties of moulding sand. The acidic/alkaline nature of the moulding sand is inherited from the binding clay material used.

The expression 'oolitics' used hereinafter in the specification refers to but is not limited to sand grain used in molding/moulding sand has the chance to circulate for a long time. Due to the repeated circulation the sand grains are repeatedly coated with bonding clay layers which successively are calcined and baked onto the grain surface. This result in a structure of concentric layers of dead clay baked around a sand grain and the process is known as Oolitalization. The degree of oolitalization is defined by the content of dead clay in the sand fraction greater than 20 microns of the washed sand and calcined at 900 degree Celsius (° C.).

The expression 'shatter index' used hereinafter in the specification refers to but is not limited to of toughness of the sand. The shatter index is particularly useful where deep pockets and intricate shaped patterns have to be stripped. The shatter index parameter is expressed as a percentage of original sample weight and the sand remaining on the anvil when the sample is dropped on a standard test piece from a height of 1.83 meters (nearly 6 feet).

The expression 'sand to metal ratio' used hereinafter in the specification refers to but is not limited to ratio of weight of sand compacted in a complete mould (cope+drag) and the total liquid or pliable raw material poured into the mold/mould. The sand to metal ratio is expressed in a numeric value.

The expression 'dry compression strength' used hereinafter in the specification refers to but is not limited to the maximum strength of the sand after drying at 220-230 Fahrenheit (° F.) and further cooling the sand to a room temperature before breaking. The normal drying time in a standard 2 inch×2 inch cylinder is 2-3 hours (hrs.).

The expression 'return sand temperature at the mixer' used hereinafter in the specification refers to but is not limited to the temperature of sand that is returning from the knock out block and the sand cooler for reuse. After pouring a hot liquid or a pliable raw material into the mold/mould, the temperature of the sand increased. To reuse the sand used in the previous casting molds, it is essential to cool the sand to an ambient temperature.

The expression 'core sand infiltration' used hereinafter in the specification refers to but is not limited to the increment of sand due to the residual disintegrated cores used during casting operation. Certain percentage of the core sand may get discarded at a shakeout station and through the sieve but a major portion of core sand mixes with the return sand. The percentage of sand relating to the aforementioned portion to the quantity of moulding sand circulated throughout the day is termed as % core sand infiltration.

The expression 'specimen weight' used hereinafter in the specification refers to but is not limited to the weight of a standard specimen of 2" diameter and 2" height in dimension. The standard specimen is prepared by using standard rammer and is expressed in terms of grams.

The expression 'friability index' used hereinafter in the specification refers to but is not limited to the characteristic of sand that is required to pack well under jolting, queering, slinging type of moulding. The molding sand is expected to flow during moulding compaction for uniform hardness therefore expected to have good flowability. A mould characterized with non-uniform hardness is soft at certain points. The softness in the sand molds exhibits low flowability which results in enlargement of casting (swelling) and/or rough casting surface.

The expression 'cone jolt test' used hereinafter in the specification refers to but is not limited to toughness test that measures the relative brittleness of the compacted sand. Broken molds/moulds and the inability to pull a deep pocket in a pattern often are the result of insufficient sand toughness, or brittleness.

The expression 'shear strength' used hereinafter in the specification refers to but is not limited to the maximum shear stress. The tempered sand mixture is capable of developing high shear strength near the sand portion containing moisture of best workability or correct temper for the purpose preparing sand moulds. It is also observed that sand exhibits high green strength with the moisture content below the temper.

The expression 'deformation' used hereinafter in the specification refers to but is not limited to measure the ability of green sand to deform before rupture. The deformation is expressed in inches per inch.

The expression 'stickiness' used hereinafter in the specification refers to but is not limited to a green property of the foundry sand used for casting. The stickiness of the green sand is evaluated manually by look and feel.

The expression 'green tensile strength' used hereinafter in the specification refers to but is not limited to the maximum tensile stress a tempered sand mixture is capable of sustaining. The prepared tempered sand mixture is rammed and tested according to standard procedures. The tensile strength is high at or near the sand portion containing moisture of best workability or correct temper for the purpose of preparing moulds. It is also observed that sand exhibits high green strength with the moisture content below the temper.

The expression 'hot strength' used hereinafter in the specification refers to but is not limited to strength of the sand at the elevated temperatures which is attend by the sand when the molten liquid or pliable raw material such as metal is poured in the mould/mold.

The expression 'flowability' used hereinafter in the specification refers to but is not limited to movement of the sand grains in a tempered mixture when the sand grains are subjected to molding forces such as Green Rammability. Green Rammability is considered to be the ability to produce the same mold hardness near and away from ramming energy application. The moulding sand is expected to flow during moulding compaction for uniform hardness therefore expected to have good flowability. A mould characterized with non-uniform hardness is soft at certain points. The softness in the sand molds exhibits low flowability which results in enlargement of casting (swelling) and/or rough casting surface especially at the side walls.

The expression 'mold hardness' used hereinafter in the specification refers to but is not limited to resistance offered by the surface of a green sand mold/mould penetration by a loaded plunger. Either too wet or too dry sand mixture results in low mold hardness. If the bond in a sand mixture is properly tempered and rammed the mould hardness will be at its peak value.

The expression 'toughness' used hereinafter in the specification refers to but is not limited to toughness of the sand mold/mould. When the sand is rammed around the pattern, the sand must possess a mobile property and while the poured liquid or pliable raw material is solidifying inside the mold. The sand must have a static property to produce castings that are precise in dimensions. This mobile property of the sand has been termed as the moldability of the sand. The toughness of the sand will affect the amount of work that has to be expended on the sand. The factor of toughness of the sand becomes a prime importance in all forms of ramming. Toughness is determined by multiplying the product of green compression strength and deformation by 1000.

The expression 'density' used hereinafter in the specification refers to but is not limited to the mass per unit volume of a rammed and tempered mixture, usually expressed in lb./cu.

The expression 'sinter point' used hereinafter in the specification refers to but is not limited to minimum temperature at which the smallest sand grain show signs of fusion when observed with a microscope at 20× to 25× magnification. The sinter point signifies the temperature at which the sand show signs of stickiness by forming a V-shape when on a platinum ribbon is dipped and lifted off the sand.

The expression 'durability' used hereinafter in the specification refers to but is not limited to amount of clay required for re-bonding the sand to a constant green strength during repeated cycle of sand castings.

The expression 'mould-gas evolution' used hereinafter in the specification refers to but is not limited to tendency of molding sands to give off gases can be studied by special procedures.

The expression 'metal penetration' used hereinafter in the specification refers to but is not limited to penetration of the molten liquid or pliable raw material such as metal into the sand mold/mould walls and seeps into the sand as though it were porous to the liquid. This results in a fused mass of metal and sand which adheres tightly to the casting.

The expression 'air-set strength' used hereinafter in the specification refers to but is not limited to a test performed in 2 inch×2 inch area of a specimen. The specimen after it has being air dried for 4 hours at a room temperature. The specimen is upended after 2 hours. The air set compression strength is determined and the value indicates a manner the green strength changes as an open mold air dries.

The expression 'mouldability' used hereinafter in the specification refers to but is not limited to determination of degree of temper of moulding sands which also considers the water requirement or sands. The mouldability measures the bulk cohesion of sand by means of the ease by which it passes a screen, this property is for the sand in loose state before compaction and it is expressed as mouldability index and it is expected to be in very close relationship with the compatibility properties of moulding sand.

The expression 'sieve distribution' used hereinafter in the specification refers to but is not limited to distribution of sand grains of washed and dried sand using standard ISO metric or AFS sieve set. The retained sand quantity on each sieve is described as a percentage of the sand sample taken for the test and these percentages are plotted on a graph with % on y axis and sieve number on the x axis at specific intervals. The typical bar chart indicates sieve distribution and depending on how many sieves about 80% of the sand is retained, the sand is termed as 2 sieves, 3 sieves and the like.

The expression 'grain shape' used hereinafter in the specification refers to but is not limited to angularity and sphere nature of the sand grains. Sand grains vary from well-rounded to rounded, sub-rounded, sub-angular, angular and very angular. Within each angularity band the sand grain may have high, medium and low score related to the spherical nature. The best foundry sand have grains which are rounded with medium to high score related to the spherical nature and giving good flowability and permeability with high strength at low binder additions. More angular and lower score related to the spherical nature sands require higher binder additions. This results in low packing density and poor flowability of the sand.

The expression 'bentonite' used hereinafter in the specification refers to but is not limited to bonding clay used in the foundry green sand. Bentonite comes from the family of clays known as montmorillonite. Montmorillonite occurs naturally and includes 10% to 15% of accessory minerals such as feldspar, quartz, biotite, mica, and calcium carbonate.

The expression 'MB value' used hereinafter in the specification refers to but is not limited to determination of active clay using Methylene blue procedure and expressed as a numeric value.

The expression 'gelling time' used hereinafter in the specification refers to but is not limited to the ability of speed of bentonite to absorb water. If the quality of the bentonite is better than the gelling time expressed in minutes is measured low.

The expression 'swelling capacity' used hereinafter in the specification refers to but is not limited to the militancy of bentonite powder. Due to the basic capacity of alkaline exchange the platelets allow moisture between each layer and swell. This ability of the bentonite to swell in volume is termed as swelling capacity and is expressed in numeric values.

The expression 'liquid or pliable raw material' used hereinafter in the specification refers to but is not limited to a metal, plastic, glass, or ceramic raw materials. If the pliable raw material is metal—the favorable metal properties should metal parameters selected from the group consisting of carbon percentage, carbon equivalent, pouring temperature, pouring time, pouring rate, pouring height (metallostatic height), inoculation procedure and metal chemistry.

The expression 'rejection type' used hereinafter in the specification refers to but is not limited to a broken mold/mould rejection, a blow hole machining and foundry stage rejection, a pin hole machining and foundry stage rejection, a sand fusion rejection, a burn on rejection, an erosion rejection, a sand drop rejection, a inclusion foundry & machining stage rejection, a metal penetration rejection, a scabbing rejection, a swelling/oversize casting rejection, an expansion scab rejection, an explosive penetration rejection, a lustron carbon defect rejection, a rough surface rejection and rat tail rejection.

The expression 'additives' used hereinafter in the specification refers to but is not limited to a cereal binder, a ground pitch, a sea coal, a gilsonite, a fuel oil, a wood flour, a silica flour, an iron oxide, a perlite, a molasses, a bentonite (calcium based), a bentonite (sodium based), a fireclay, a kaolin clay, an asphalt, a lamp black, a cellulose, a cob flour, a furfural residue, an oat hulls, a walnut shell flour, an asphalt emulsion, a kerosene, a soda ash, a wetting agent, a alumina, a chromite flour, a fly ash, an olivine flour, a staurolite flour, a zircon flour, a bran flour, a british gum, a lignin sulfate, a sodium silicate, and a wheat flour.

These definitions are in addition to those expressed in the art.

BACKGROUND

In any manufacturing industry, casting appears to play a very significant role in manufacturing a part of machinery or machinery or a product. To develop or build the product with accurate measurements, initially a mold/mould is prepared which is a hollowed-out block equivalent to the desired product design and measurement. A liquid or pliable raw material is poured into the prepared mold, which easily acquires the shape and size of the mold. The molds containing the liquid or pliable raw material are cooled to retrieves the casted products thereafter. The liquid or pliable raw material includes metal, plastic, glass, or ceramic raw materials. The prepared mold is also known as counter part of the cast.

It has been observed that in metal casting manufacturing foundries or factories, statistics reveals seventy percent of all metal castings are produced using sand casting worldwide. In the sand casting process, molds are prepared by using sand or clay which is relatively very cheap/economic and available in the ecology in abundance. The molding sand is typically contained in a system of frames or mold boxes known as a flask. The mold cavities and gate system are created by compacting the sand around models, or patterns, or carved directly into the sand. However, it has been reported by the foundry industries using sand casting process for manufacturing products, that in sand casting process there is no limitation on the rejections of the sand casted molds countered in one and subsequent castings. Further, due to variations and limitless casting rejections affects the overall production of the casted products in foundry. This eventually results in low productivity of the foundry.

Additionally, it has been pragmatically apparent that to schedule certain instructions/checks in the manufacturing process of the casted products using a casting methodology, utilizes a lot of manual labor to monitor and take actions as when desired. This induces a high cost of labor in the casting process with low production rate in the foundry. Enormous efforts have been put in by researchers relating to casting rejection analysis in mitigating the sand castings rejections and improving the sand casting yield in foundries. However, to understand and moderate the factors contributing in the sand casting yield and its rejections are done manually and further prone to human error. This places a foundry person in a confounded situation which may result in directionless decision, further affecting the productivity of the foundry.

Therefore, in view of the aforementioned drawbacks, there is felt a need for a system that provides accurate analysis of the factors in the foundry influencing casting rejections.

Additionally, there is a need for a system that alleviates the chances of taking directionless decisions by the foundry person.

OBJECTS

Some of the objects of the present disclosure are described herein below:

An object of the present disclosure is to provide a computer implemented system for reducing casting rejections or casting defects.

Yet another object of the present disclosure is to provide a system for predicting optimization of sand for the purpose of reducing rejections in a foundry.

Another object of the present disclosure is to provide a system for predicting optimization green sand/returned sand/recycled sand for the purpose of reducing rejections in a foundry.

Further, another object of the present disclosure is to provide a system for predicting optimization green sand/returned sand/recycled sand for the purpose of reducing rejections and re-utilization of the used sand in a foundry.

Still a further object of the present disclosure is to provide a system for prescribing optimization of sand for the purpose of reducing rejections in a foundry.

One more object of the present disclosure is to make available a system that provides a single point of entry for all the data elements purported to be used for various analytics.

Yet another object of the present disclosure is to provide a system that presents a consolidated view of various analytics in a multidimensional curve.

One more object of the present disclosure is to provide a self-learning system that automatically learns and updates itself.

Yet another object of the present disclosure is to make available a system that provides a foundry person to build computerized model with the desired parameter values.

Still a further object of the present disclosure is to provide a subscription based system to be used by the foundry user.

One more object of the present disclosure is to provide a system that accessed online from anywhere and at any given time via a computer network.

It is an object of the present disclosure to ameliorate one or more problems of the prior art, or, to at least provide a useful alternative.

SUMMARY

The present disclosure envisages a computer implemented system for optimization of sand for the purpose of reducing casting rejections in a foundry. The system, in accordance with the present disclosure includes:

a first repository configured to store therein data pertaining to a set of primary sand parameters, wherein the parameters is selected from the group consisting of Green Compression Strength (GCS), compact-ability index, moisture content, active clay, inert fines content, Loss On Ignition percent (LOI), permeability index, wet tensile strength, volatile matter content, grain fineness number (GFN or AFS), oolitics content and pH value of the sand;

a second repository configured to store therein data pertaining to rejection type and rejection quantity;

a third repository configured to store therein pattern generated using the parameter corresponding to the rejections;

an input module cooperating with the first repository, the input module configured to receive at least a value corresponding to the at least one parameter for an instance;

a processor module cooperating with the first repository, the second repository, the third repository and the input module, the processor module configured to correlate the parameter values, the parameters, the rejections, and the rejection type, and provide correlation between the parameter values, the parameters, the rejections, and the rejection type for each of the instance;

a pattern forming engine coupled with the processor module, the pattern forming engine configured to determine at least a pattern based on the correlations of the parameter values, parameters, rejections, and rejection type, the pattern generated being at least a complex equation which takes into account each of the correlated data to form a complex multi-dimensional curve; and a predictive-prescriptive module cooperating with the pattern forming engine and the processor module, the predictive-prescriptive module configured to receive the input values corresponding to the parameters fed by a user, the predictive-prescriptive module being configured to map the input values into the complex equations and generate at least a predictive/prescriptive solution including a degree of probability.

In accordance with the present disclosure, the first repository is further configured to store data pertaining to a secondary set of sand and related metal casting parameters for reducing sand related casting defects selected from the group consisting of shatter index, sand to metal ratio, dry composition strength, return sand temperature at the mixer, core sand infiltration, specimen weight, friability index, cone jolt test, shear strength, deformation, stickiness, green tensile strength, hot strength, flow-ability, mould hardness, toughness, density, sinter point, durability, mould-gas evolution, metal penetration, air-set strength, mouldability, sieve distribution, grain shape, bentonite content, M B value, gelling time, swelling capacity, and metal related parameters.

In accordance with the present disclosure, the system further comprises a display module cooperating with the processor and the predictive-prescriptive module, the display module configured to display the predictive/prescriptive solution including a degree of probability and the correlated data which is graphically represented in a user readable format.

In accordance with the present disclosure, the system comprises a self-learning editor, the editor cooperating with the pattern forming engine and the predictive-prescriptive module, the editor configured to store each and every multi-dimensional curve generated into a temporary repository, the editor configured to determine the predicted rejections and the rejection type present in the predictive/prescriptive solution and further configured to compare and correct the predicted values corresponding to the rejections and the rejection type with the actual rejections and rejection types input by the user.

In accordance with the present disclosure, the editor is configured to store and update the corrected rejections and the rejection type present in the predictive/prescriptive solution into the third repository.

In accordance with the present disclosure, the editor is configured to take an action related to the rejection of improbable rejections, wherein the action is selected from a group consisting of determining, retaining, discarding, updating and storing the improbable rejections into the third repository.

The present disclosure envisages a computer implemented method for predicting or prescribing optimization of sand for the purpose of reducing casting rejections in a foundry. The method, in accordance with the present disclosure includes the following steps:

storing at a first repository, data pertaining to a set of primary sand parameters, wherein the parameters is selected from the group consisting of Green Compression Strength (GCS), compact-ability index, moisture content, active clay, inert fines content, Loss On Ignition percent (LOI), permeability index, wet tensile strength, volatile matter content, grain fineness number (GFN or AFS), oolitics content and pH value of the prepared sand;

storing at a second repository, data pertaining to rejection type and rejection quantity;

storing at a third repository, pattern generated using the parameter corresponding to the rejections;

mapping of the rejections related to the parameters corresponding to the day of the casting process;

inputting a current set of values corresponding to the parameters for an instance for which at least a prediction/prescription solution is desired;

correlating the current set of input values with the parameter values stored in the first repository, rejection value and rejection types stored in the second repository and the patterns stored in the third repository, and providing correlation between the parameter values, the parameters, the rejections, and the rejection type for each of the instance;

processing the correlated data and the parameters for determining at least a pattern in the correlated data;

deriving at least a multi-dimensional complex curve based on the pattern generated by processing at least a complex equation, wherein each of the multi-dimensional curve being a prescriptive/predictive solution to the pattern; and subsequently, fitting the current values of parameters to the closest fit of the curve derived by processing and mapping the current set of input values corresponding to the parameters into the complex equation to obtain the predictive/prescriptive rejection value including a degree of probability.

In accordance with the present disclosure, the step of storing data pertaining to the primary sand parameters further includes the step of storing data pertaining to a secondary set of sand and related metal casting parameters for reducing sand related casting are selected from the group consisting of shatter index, sand to metal ratio, dry composition strength, return sand temperature at the mixer, core sand infiltration, specimen weight, friability index, cone jolt test, shear strength, deformation, stickiness, green tensile strength, hot strength, flow-ability, mould hardness, toughness, density, sinter point, durability, mould-gas evolution, metal penetration, air-set strength, mouldability, sieve distribution, grain shape, bentonite, M B value, gelling time, swelling capacity, and metal related parameters.

In accordance with the present disclosure, the step of processing and mapping the complex equation to obtain the predictive/prescriptive rejection value further includes the step of displaying the predictive/prescriptive solution including a degree of probability and the correlated data which is graphically represented in a user readable format.

In accordance with the present disclosure, the step of processing and mapping the complex equation to obtain the predictive/prescriptive rejection value further includes the step of determining the predicted rejections and the rejection type present in the predictive/prescriptive solution and subsequently comparing and correcting the predicted values corresponding to the rejections and the rejection type with the actual rejections and rejection types input by the user.

In accordance with the present disclosure, the step of comparing and correcting the predicted values corresponding to the rejections and the rejection type with the actual rejections and rejection types input by the user further includes the step of storing and updating the corrected rejections and the rejection type present in the predictive/prescriptive solution into the third repository.

In accordance with the present disclosure, the step of determining the predicted rejections and the rejection type present in the predictive/prescriptive solution further includes the step of taking an action related to rejection of improbable rejections, wherein the action is selected from a group consisting of determining, retaining, discarding, updating and storing improbable rejections into the third repository.

BRIEF DESCRIPTION OF THE ACCOMPANYING DRAWINGS

The computer implemented system and method for optimization of sand for the purpose of reducing casting rejections in a foundry will now be described with reference to the non-limiting, accompanying drawings, in which.

Figure 2:
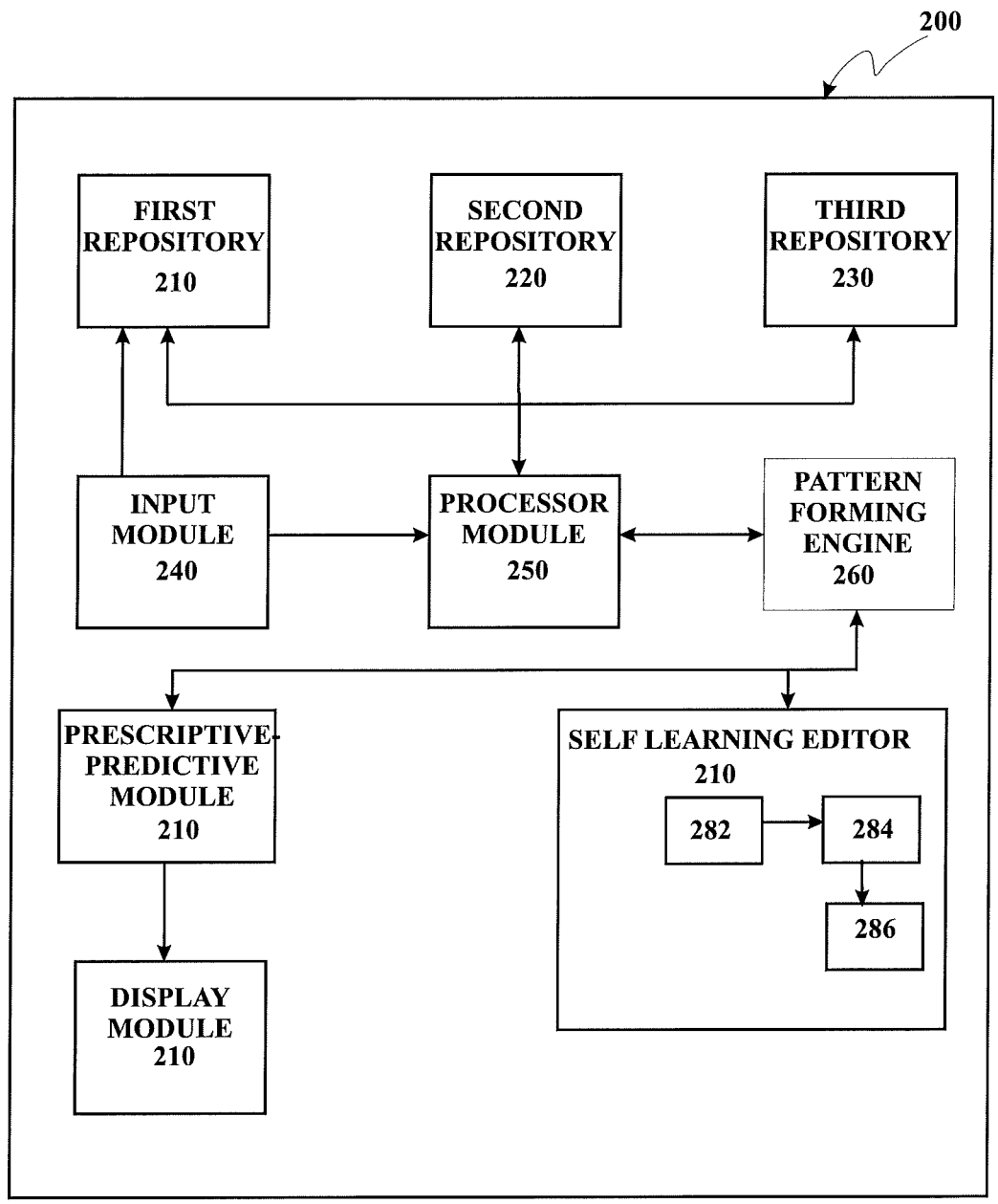
FIG. 2 illustrates a block diagram encompassing the functionality modules of the system for optimization of sand for the purpose of reducing casting rejections in a foundry, in accordance with the present disclosure.
Figure 3A:
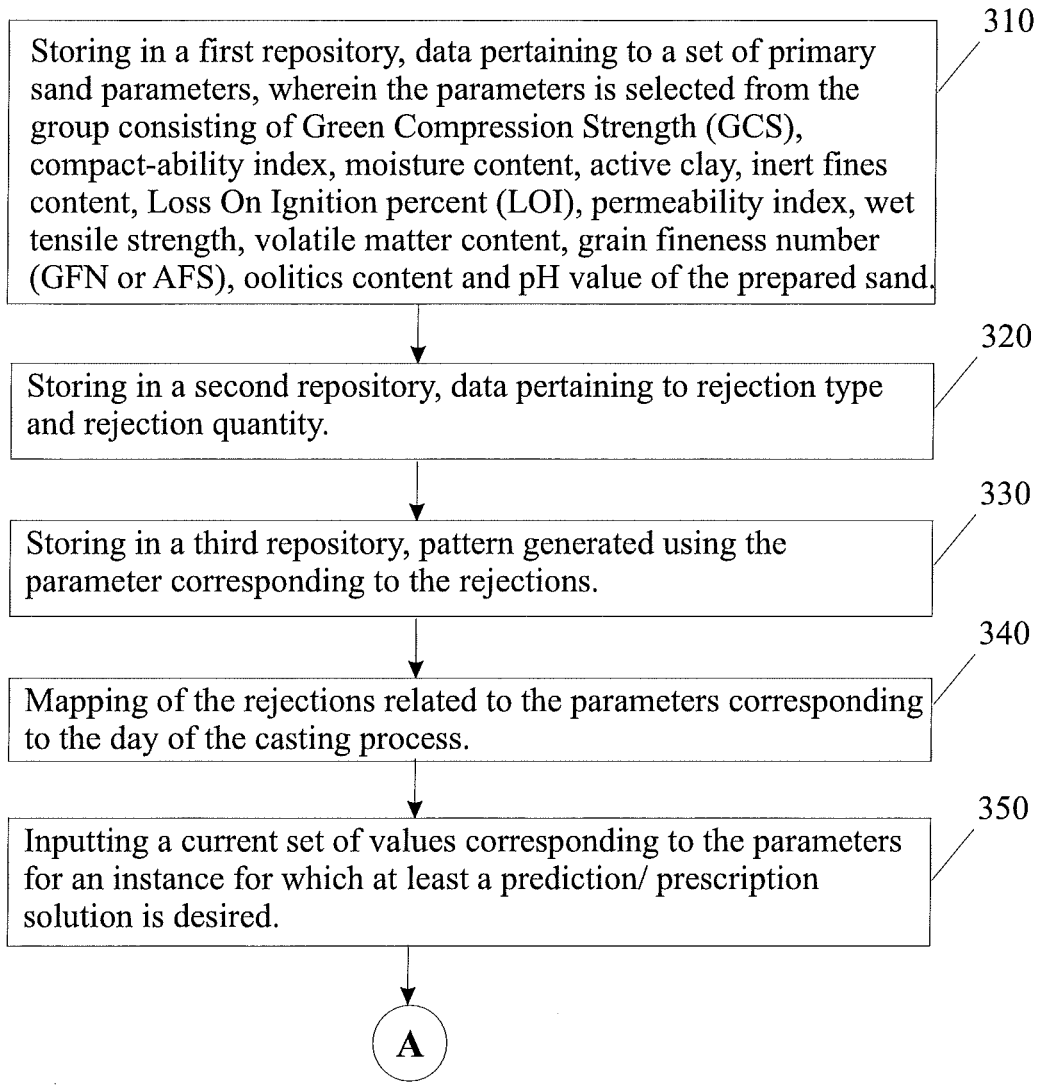
Figure 3B:
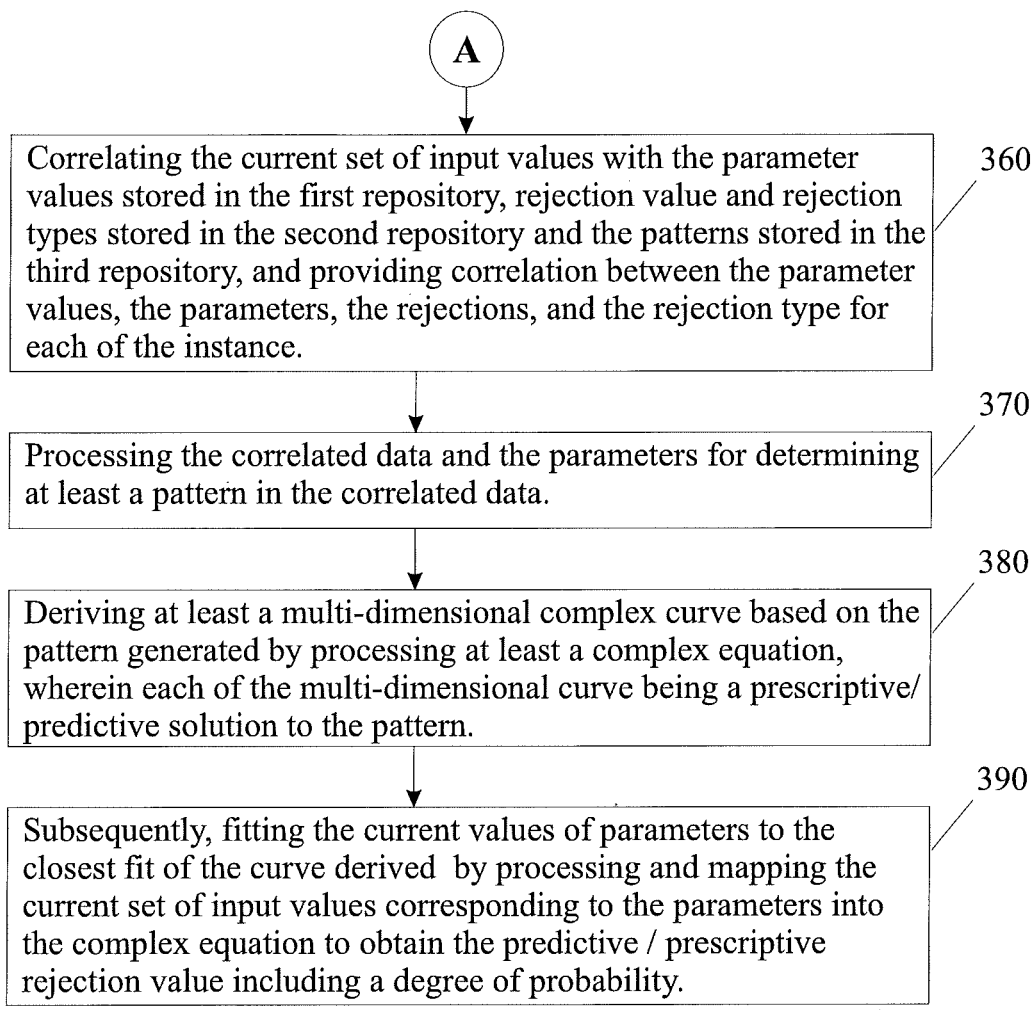

FIGS. 3(a) and 3(b) is a flowchart illustrating the steps involved corresponding to the method for implementing the system for optimization of sand for the purpose of reducing casting rejections in a foundry as illustrated in FIG. 2, in accordance with the present disclosure.

Figure 1:
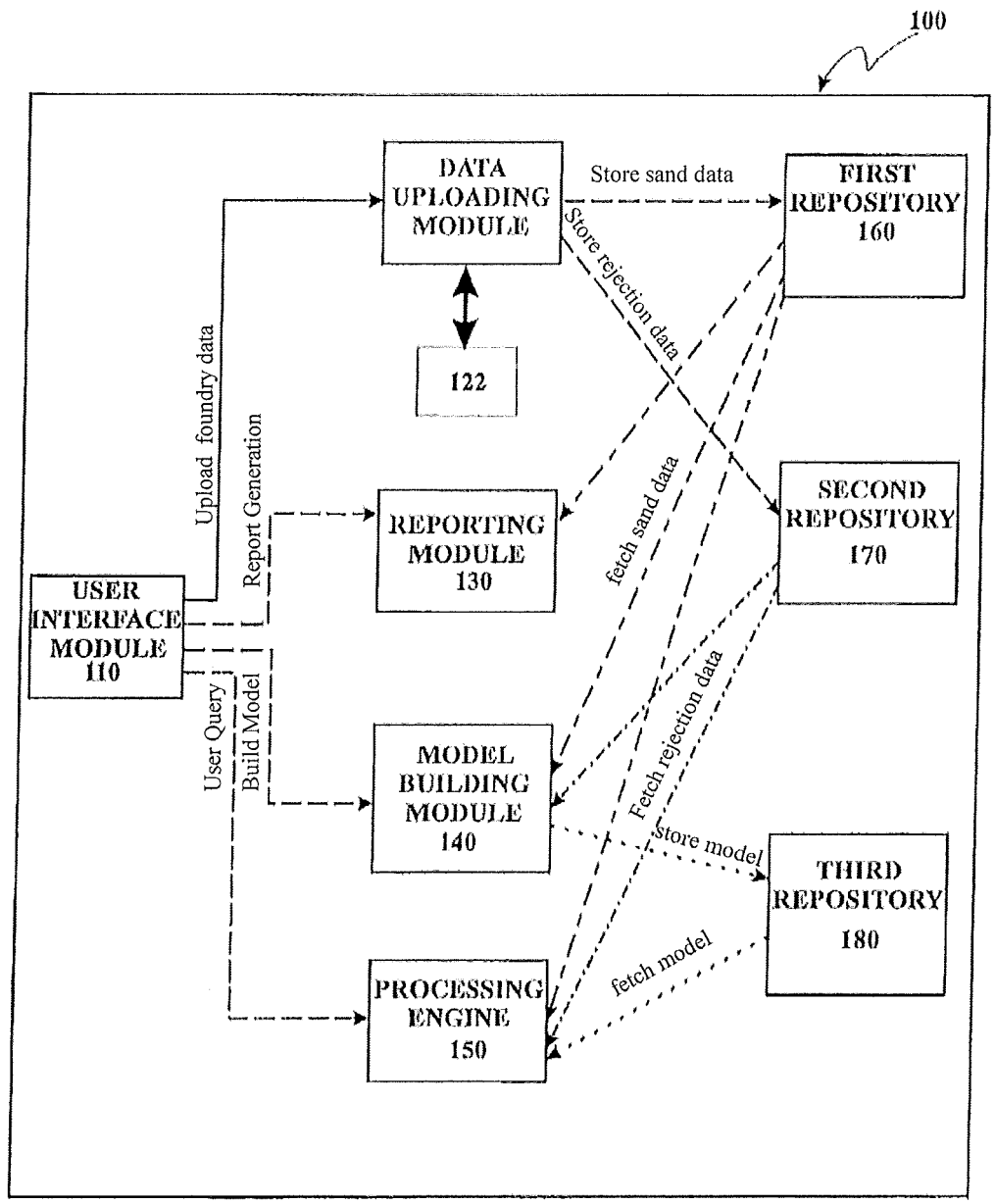
FIG. 1 illustrates a schematic architectural data flow diagram of the computer implemented system for optimization of sand for the purpose of reducing casting rejections in a foundry, in accordance with the present disclosure.
Figure 4:
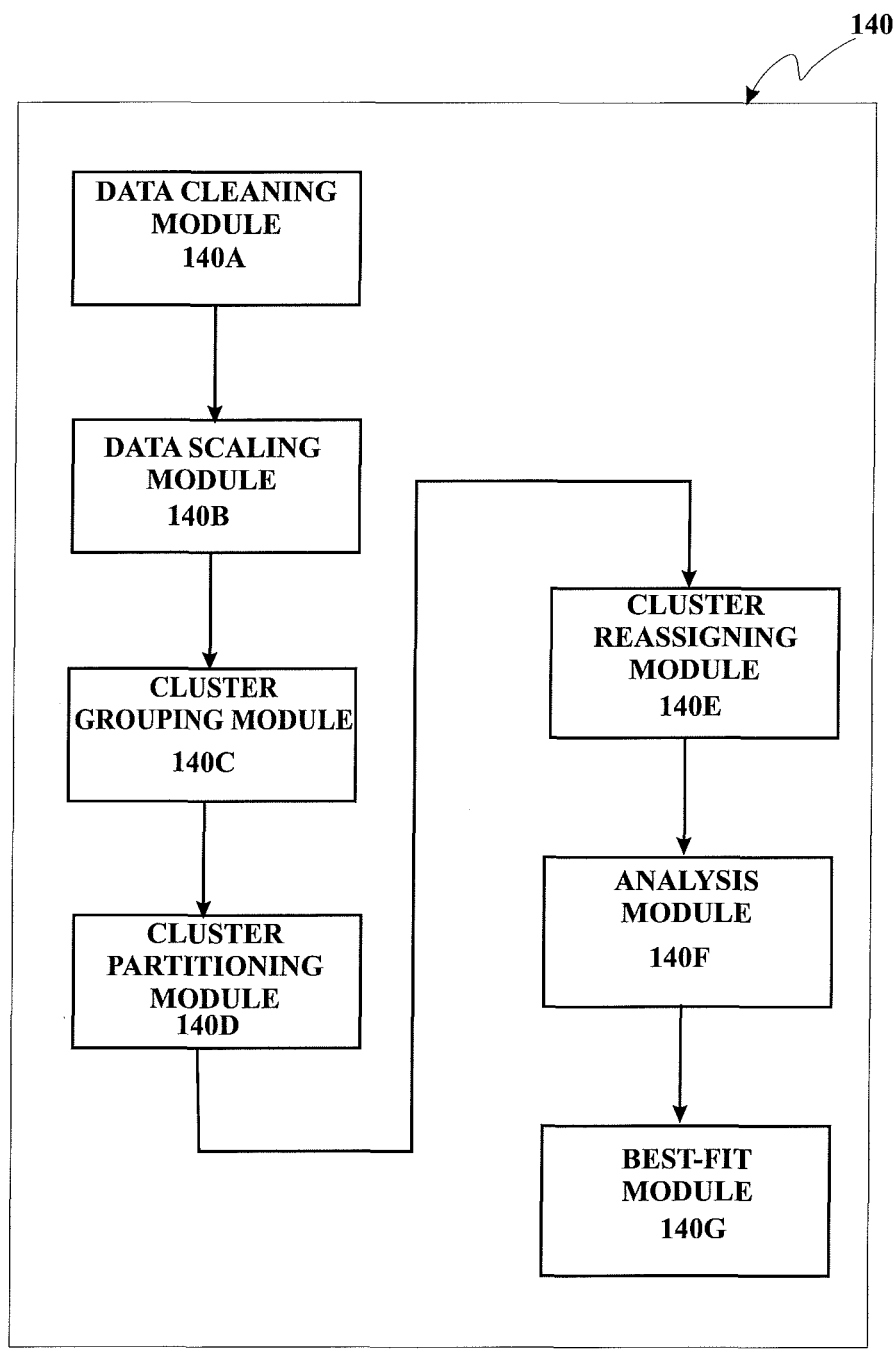

FIG. 4 illustrating a schematic data flow diagram for the synthesis of a mathematical model using the model building module 140 of FIG. 1, in accordance with the present disclosure.

Figure 5A:
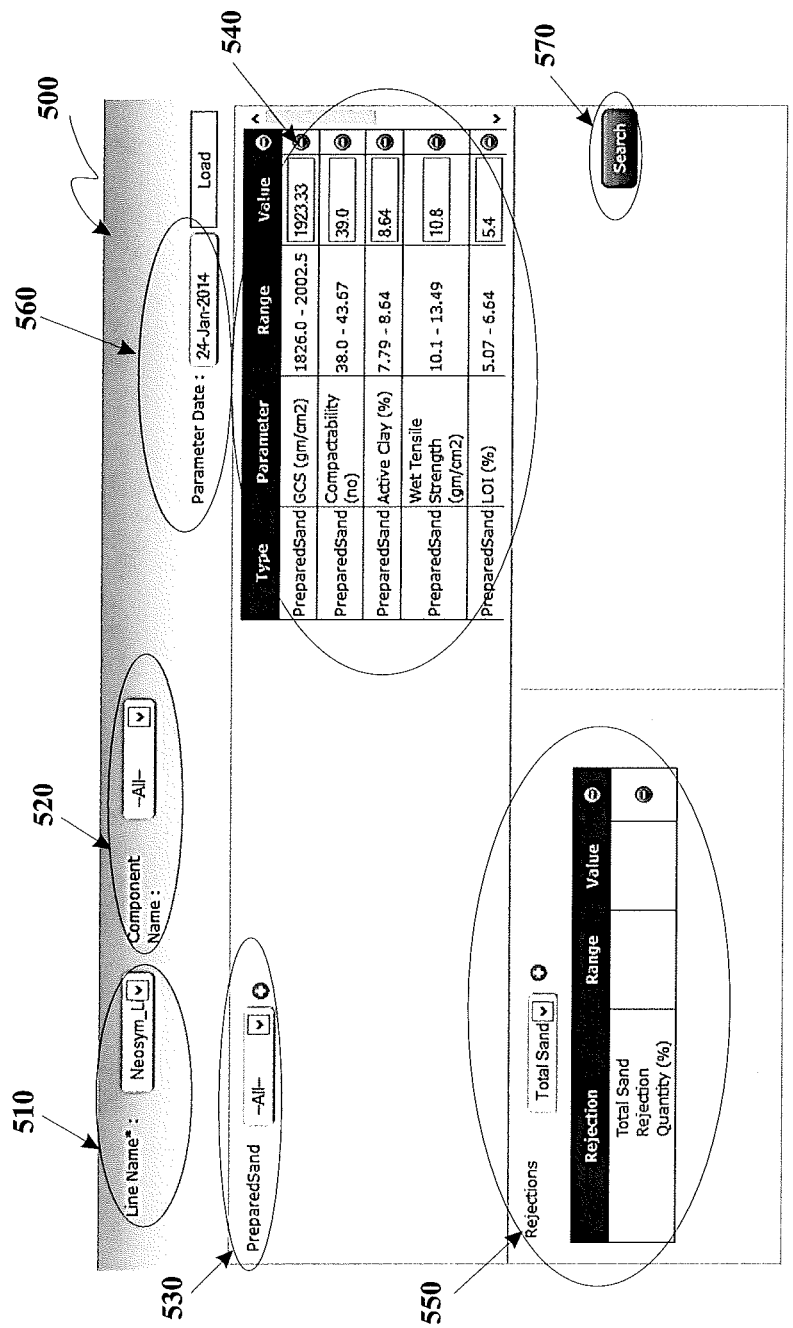
Figure 5B:
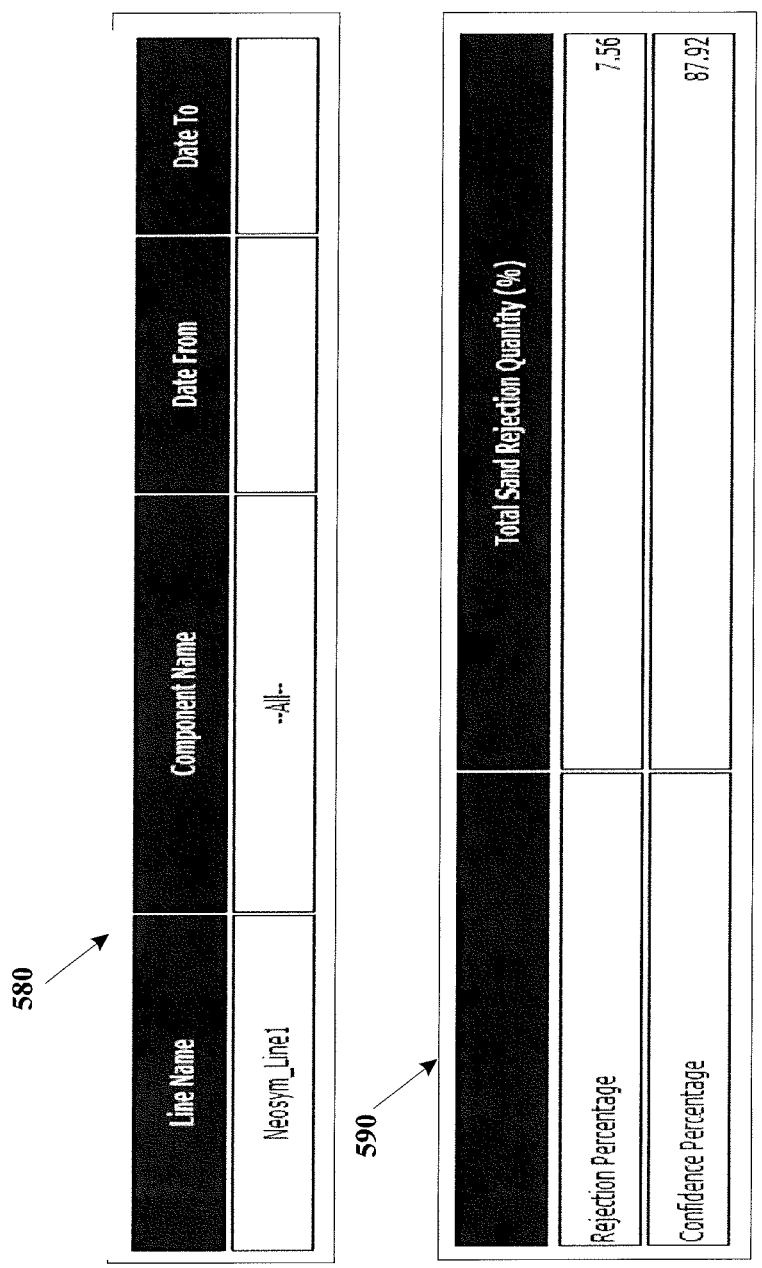
Figure 6A:
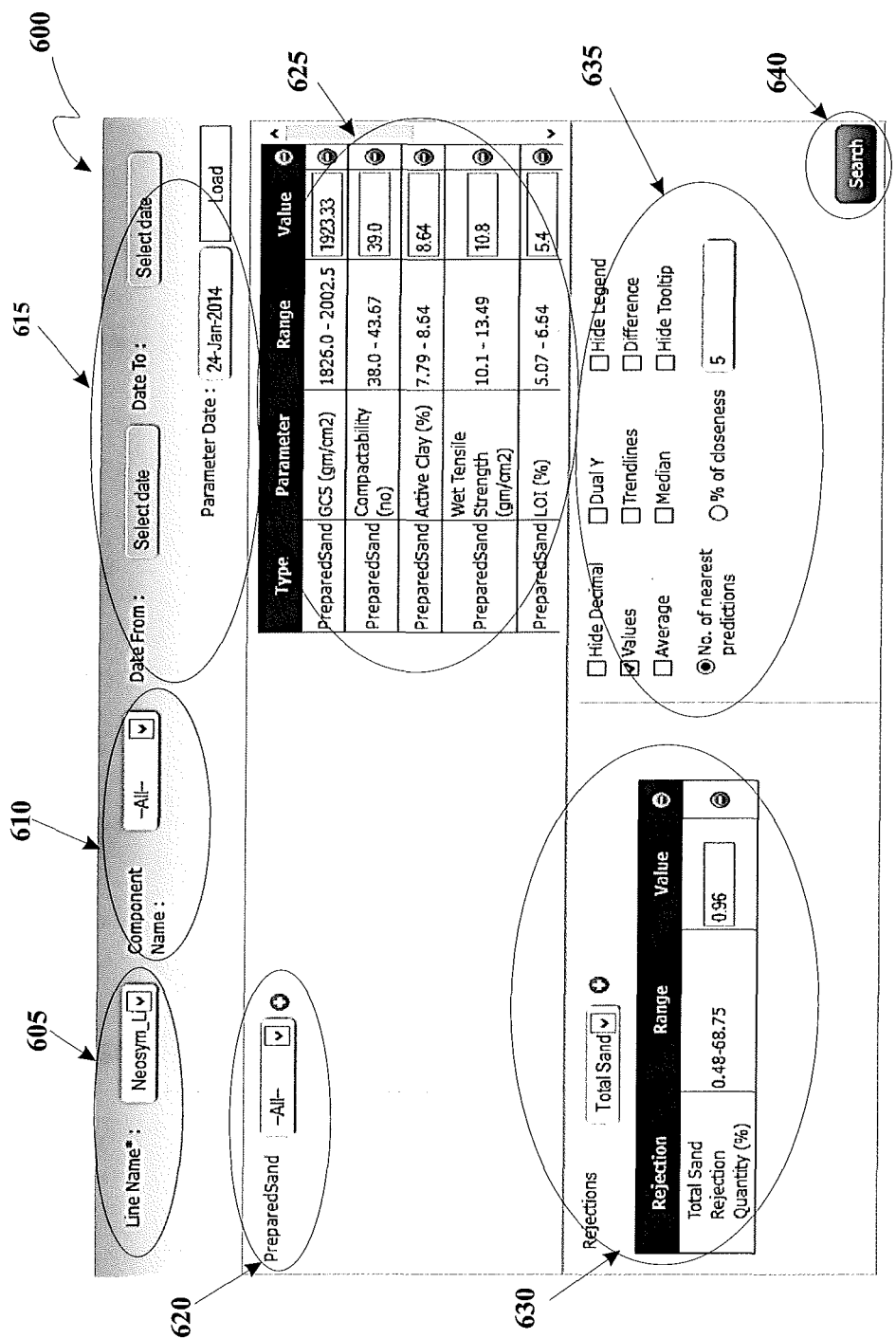
Figure 6C:
Figure 6D:
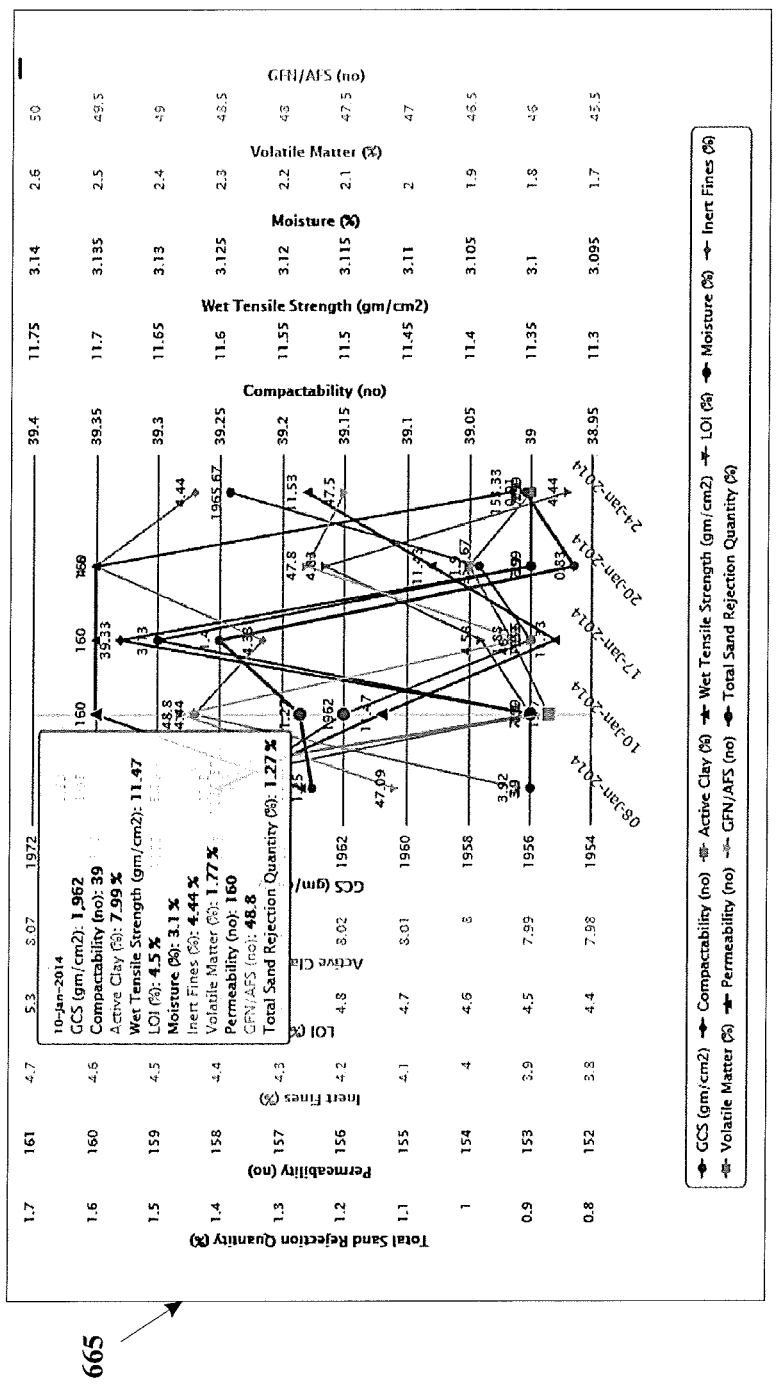

FIGS. 5(a) and 5(b) illustrating website screen shots of an embodiment of present disclosure with an example of data input and data output for a parameter rejection predictor module to be utilized by the processing engine 150 of FIG. 1 and the processor module 250 of FIG. 2.

FIGS. 6(a) to 6(d) illustrating website screen shots of an embodiment of present disclosure with an example of data input and data output for a parameter neighborhood locator module to be utilized by the processing engine 150 of FIG. 1 and the processor module 250 of FIG. 2.

Figure 7A:
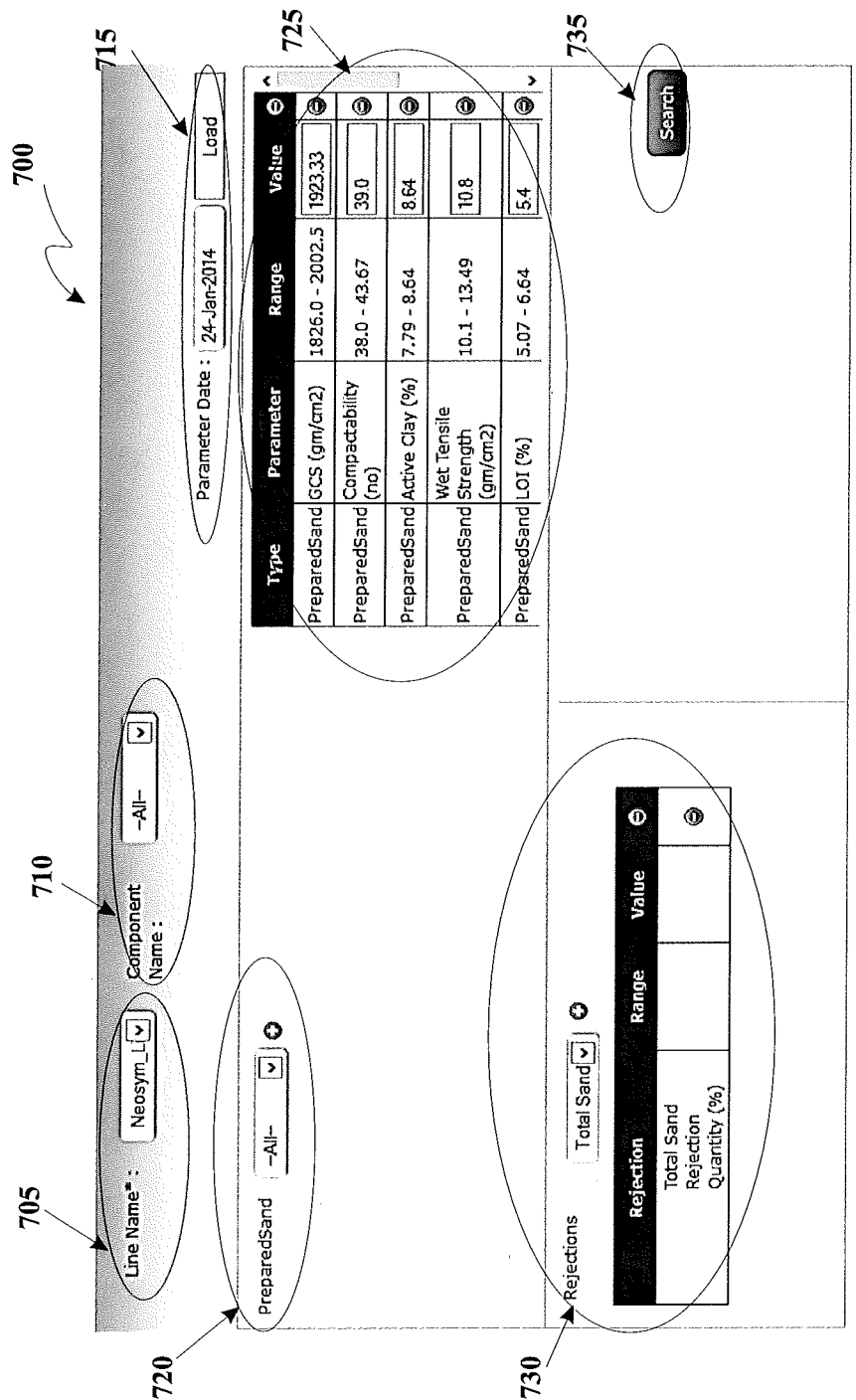

FIGS. 7(a) and 7(b) illustrating website screen shots of an embodiment of present disclosure with an example of data input and data output for a parameter anchor rejection predictor module to be utilized by the processing engine 150 of FIG. 1 and the processor module 250 of FIG. 2.

Figure 8A:
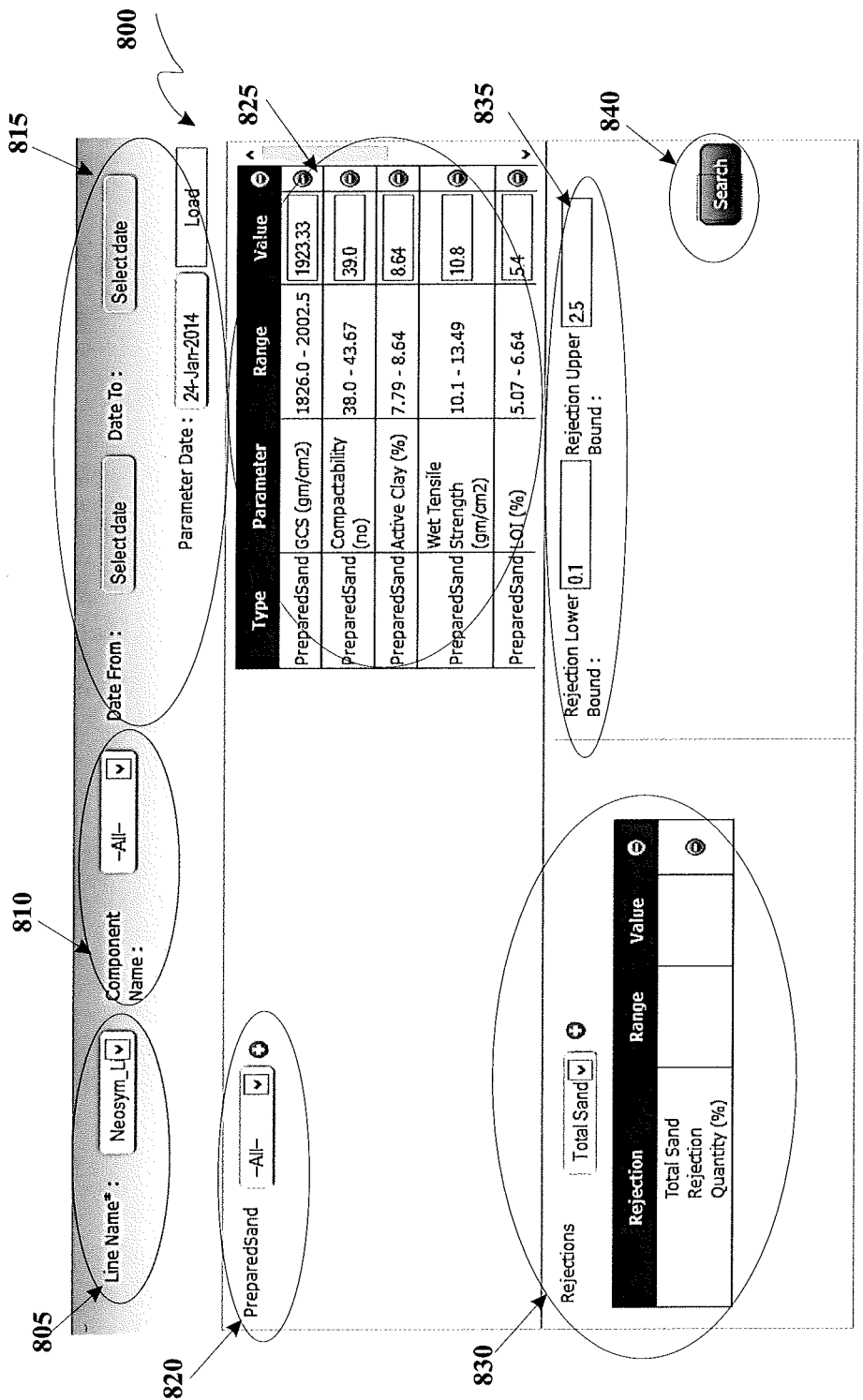
Figure 8B:
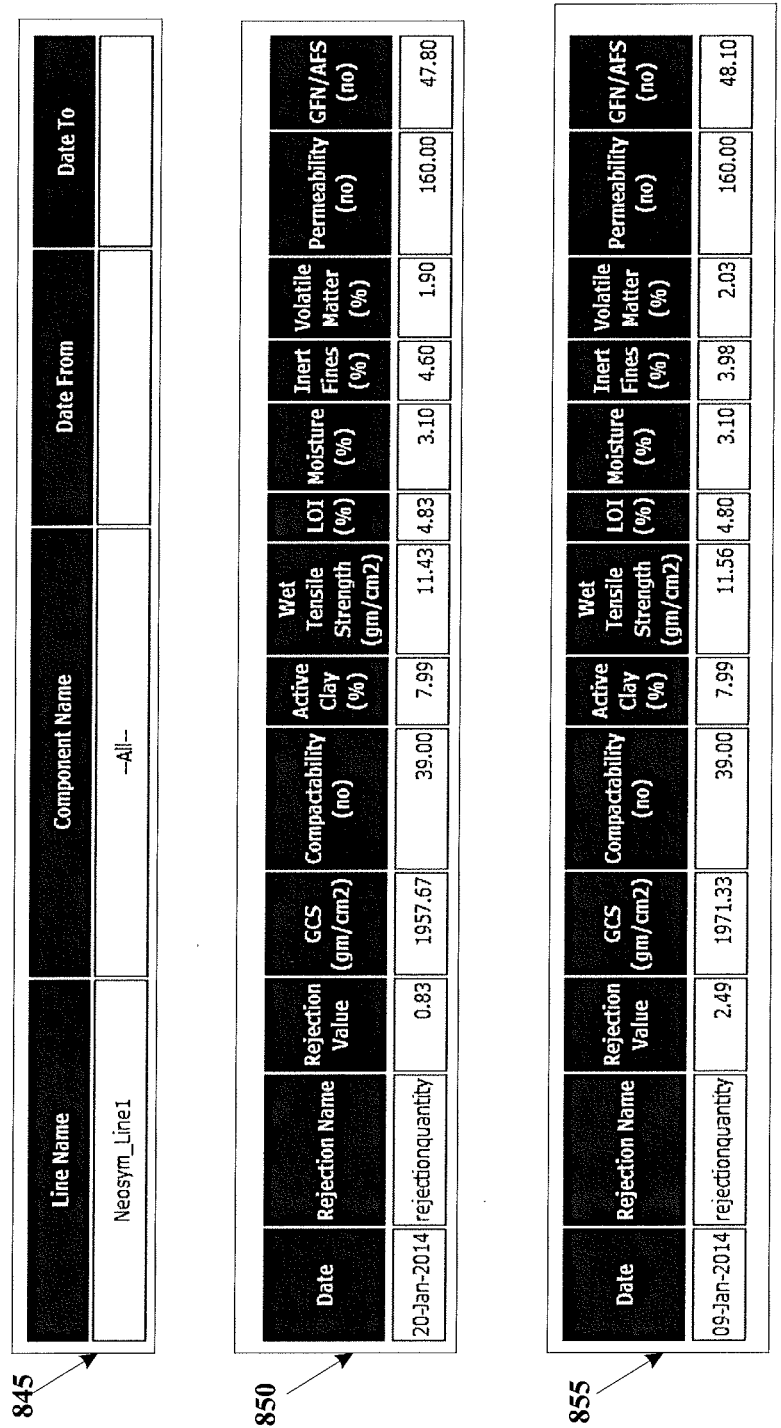
Figure 9A:
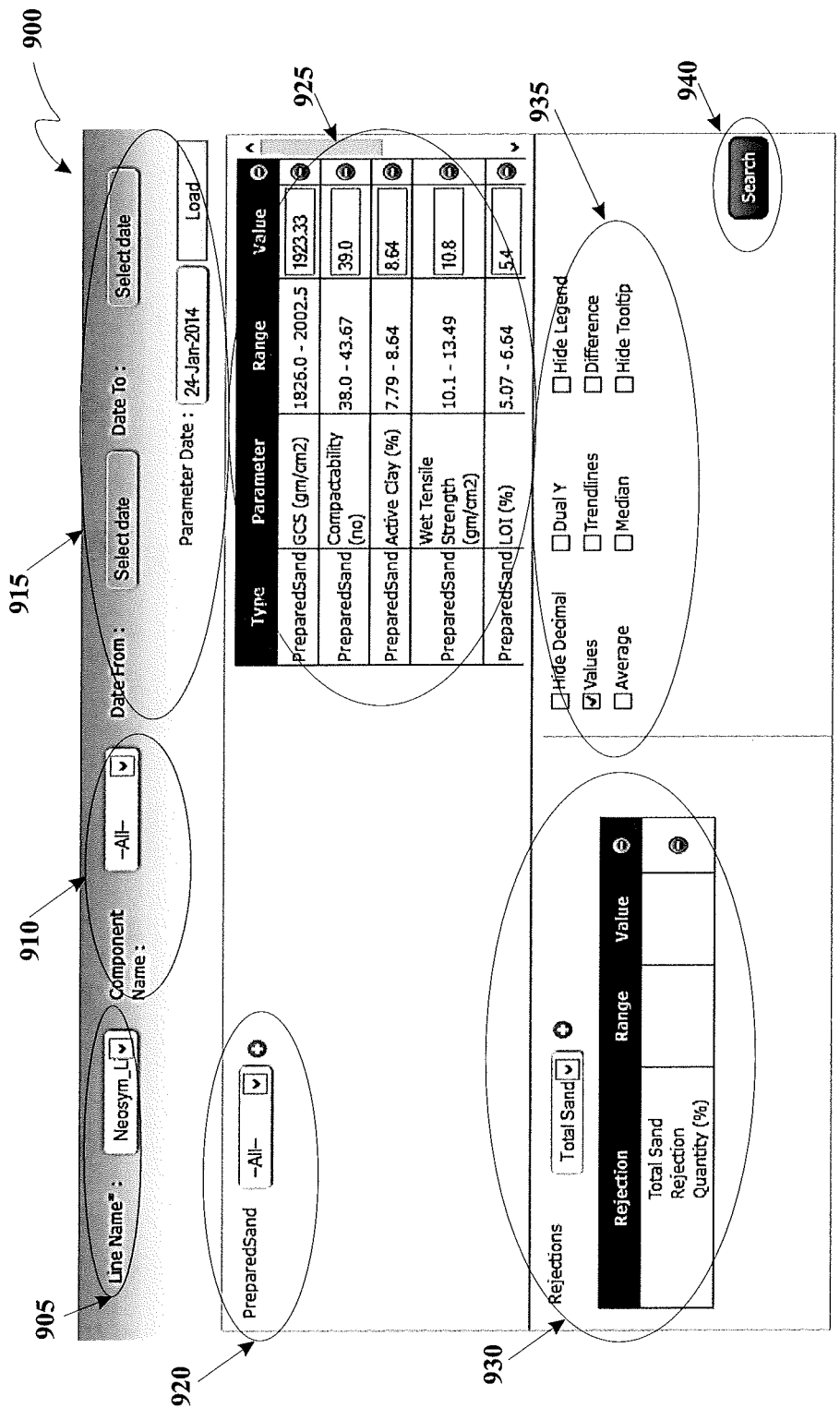

FIGS. 8(a) and 8(b) illustrating website screen shots of an embodiment of present disclosure with an example of data input and data output for a lowest-high rejection locator module to be utilized by the processing engine 150 of FIG. 1 and the processor module 250 of FIG. 2.

FIGS. 9(a) to 9(d) illustrating website screen shots of an embodiment of present disclosure with an example of data input and data output for a significant parameter predictor module to be utilized by the processing engine 150 of FIG. 1 and the processor module 250 of FIG. 2.

Figure 10A:
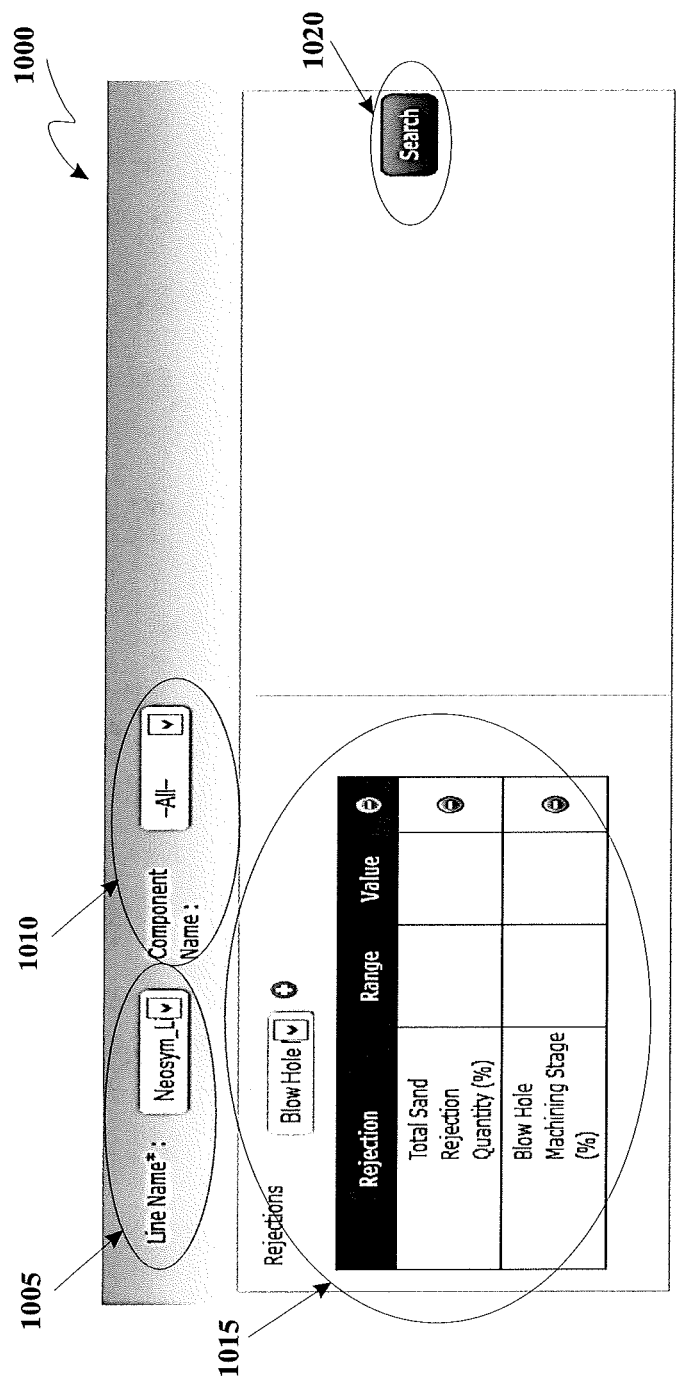
Figure 10B:
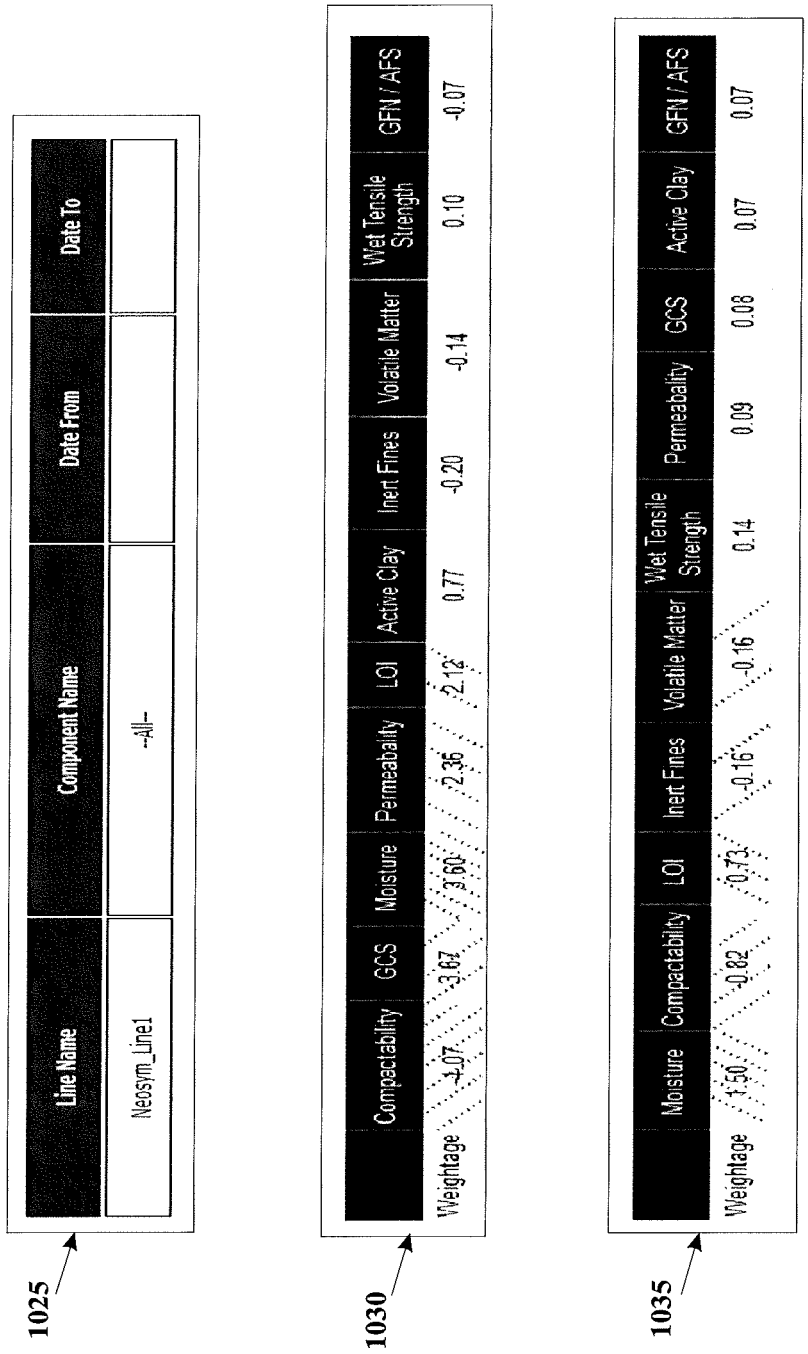

FIGS. 10(a) and 10(b) illustrating website screen shots of an embodiment of present disclosure with an example of data input and data output for a rejection heat map module to be utilized by the processing engine 150 of FIG. 1 and the processor module 250 of FIG. 2.

FIGS. 11(a) to 11(d) illustrates a first case study showing the website user interface related to the computer implemented system 100 for optimization of sand for the purpose of reducing casting rejections in a foundry of FIG. 1, in accordance with the present disclosure.

Figure 12:
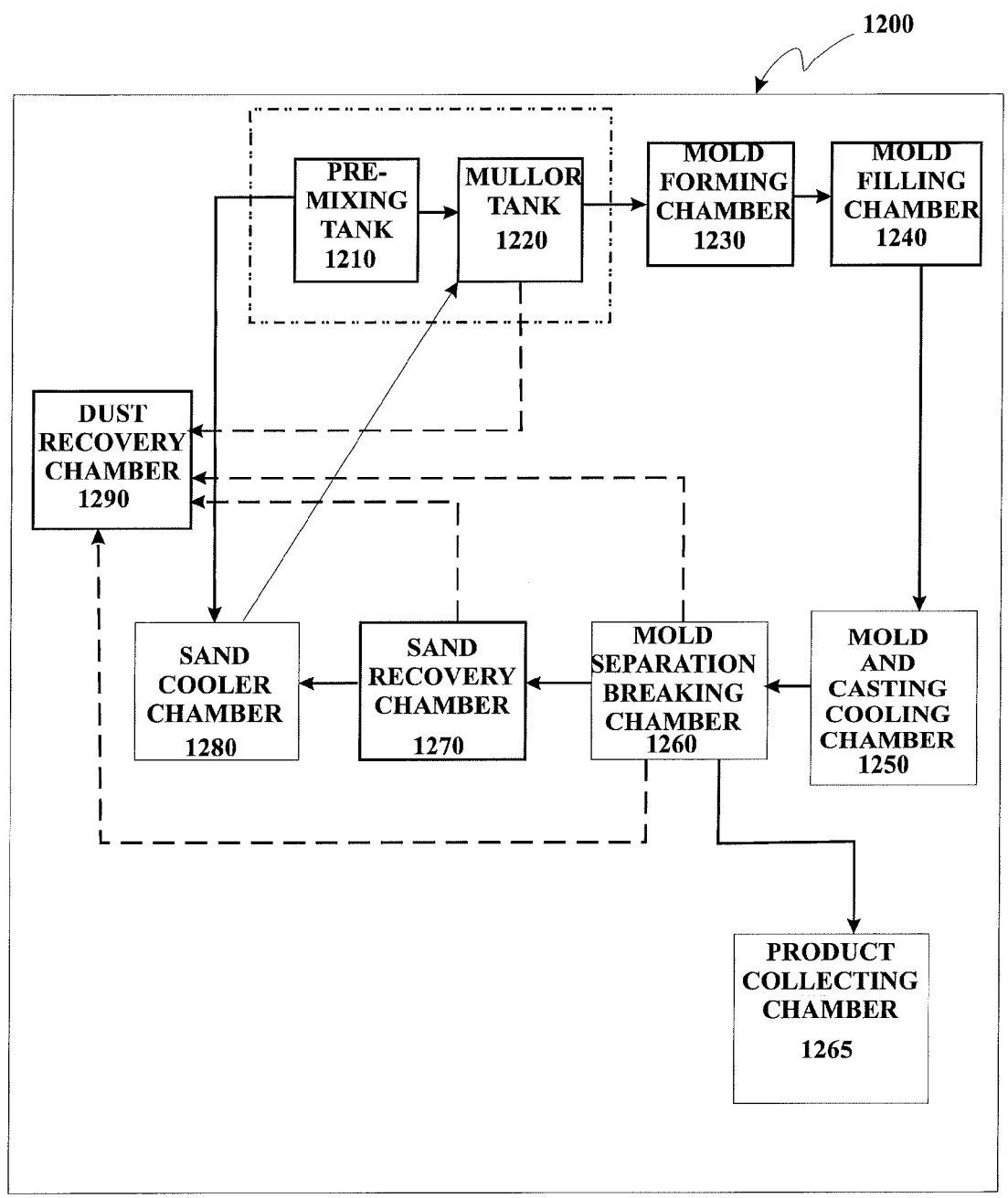

FIG. 12 illustrating a data flow block diagram of the foundry components in a foundry, in accordance with the present disclosure.

Figure 13:
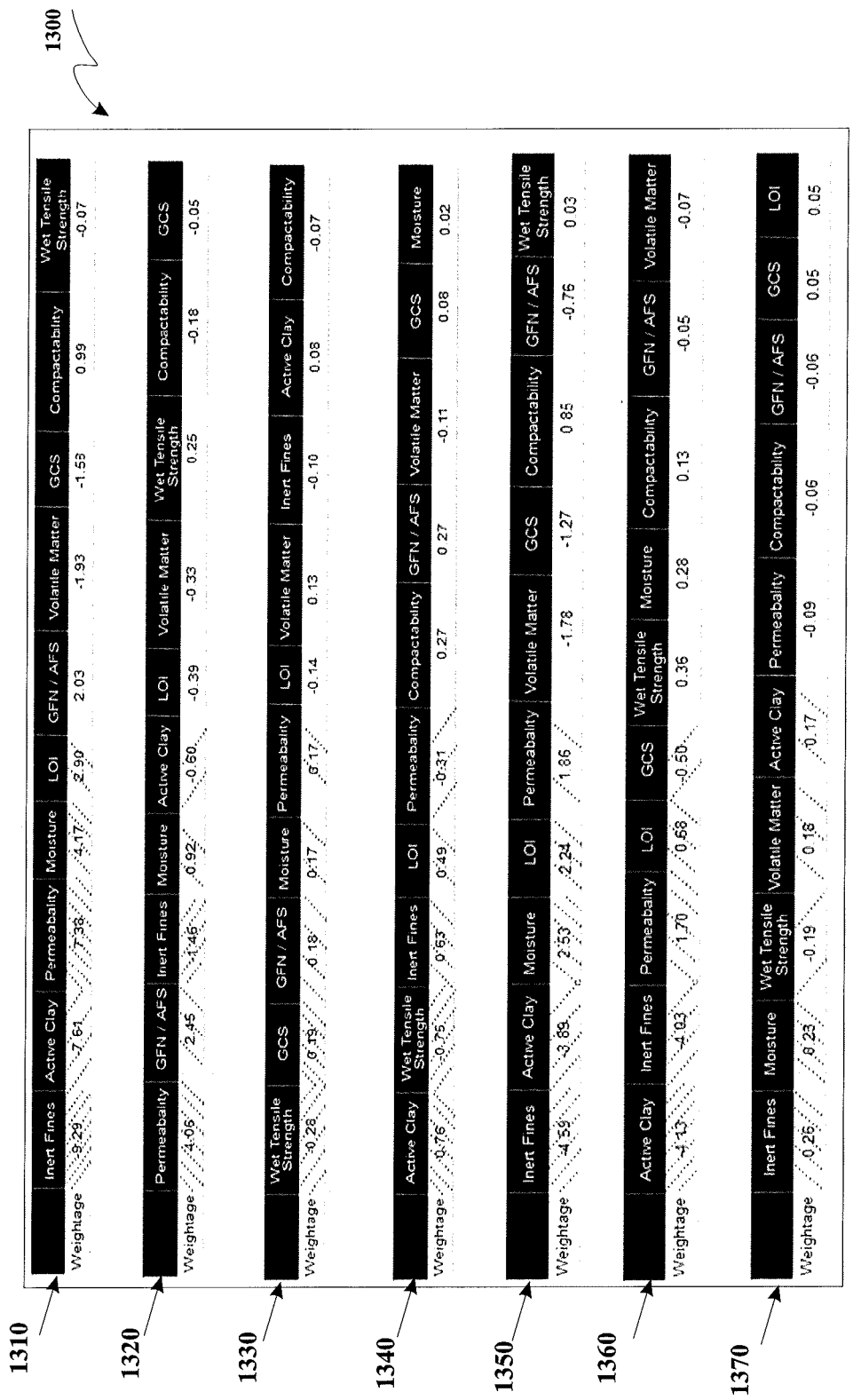

FIG. 13 a second case study showing co-relation between heat map for individual rejection type vis a vis rejection type for total sand rejection based on historical data related to the computer implemented system 100 for optimization of sand for the purpose of reducing casting rejections in a foundry of FIG. 1.

DETAILED DESCRIPTION

The computer implemented system and method for optimization of sand for the purpose of reducing casting rejections in a foundry will now be described with reference to the accompanying drawings which do not limit the scope and ambit of the disclosure. The description provided is purely by way of example and illustration.

The present disclosure envisages an online system and method for optimization of sand for the purpose of reducing casting rejections in a foundry accessed via computer network. In accordance with the present disclosure, the system can be accessed by a user associated with a foundry after registering his/her foundry with the system. The registration of the foundry takes by purchasing an online subscription of the system for a typical time period. A registered foundry is enabled to have multiple online accounts managed by different users associated with the foundry and having different legitimate authorizations to access the system. The administrator of the foundry reserves the rights to create multiple user accounts, assigning legitimate authorization rights to the accounts and further managing the user accounts created by him. The foundry users are enabled to login into the system for providing at least one user credential such as a username, an email id, a password, and an answer to a secret question.

Referring to the accompanying drawings, FIG. 1 shows a schematic architectural data flow diagram of the computer implemented system 100 for optimization of sand for the purpose of reducing casting rejections.

In accordance with one aspect of the present disclosure, the system 100 comprises a user interface module 110, a data uploading module 120, a reporting module 130, a model building module 140, a processing engine 150, a first repository 160, a second repository 170, and a third repository 180. The foundry user with a legitimate authorization to access the system 100 is enabled to upload data pertaining to prepared sand, additives, casting rejections/defects, and return/recycled sand using the user interface module 110. The user interface module 110 communicates with the data uploading module 120 which is enabled to receive the data entered by the user at the user interface module 110. The data uploading module 120 includes a validator 122 having validation rules stored therein, the validator 122 is enabled to validate the data uploaded by the user by applying the validations rules. Once the user entered data is validated by the validator 122, the data uploading module 120 stores the validated data pertaining to prepared sand, additives and return/recycled sand into the first repository 160 and validated data pertaining to casting rejections/defects into the second repository 170.

The reporting module 130 communicates with the first repository 160 and the second repository 170 enables the foundry user to fetch data pertaining to prepared sand, additives, return/recycled sand and casting rejection. In addition, the reporting module 130 further enables the foundry user to generate reports as desired based on the fetched data from the repositories. The model building module 140 is enabled to receive instructions from the foundry user to build a model. The model building module 140 having model building rules stored therein and communicates with the first repertory 160 and the second repository 170 to fetch data from the data from the repositories. The model building module 140 fetches data the first repertory 160 and the second repository 170 based on the instructions received from the foundry user to build a model and further configured to apply the model building rules on the fetched data for building a model. The foundry user is enabled to view the model developed by the model building module 140 is through his/her the user interface module 110. Subsequently, the model building module 140 communicates with the third repository 180 to store the newly build model for future reference or analysis. The foundry user is enabled to post a query through his/her user interface module 110 which is received by the processing engine 150. The processing engine 150 having query processing rules stored therein and further enabled to communicate with the first repository 160, a second repository 170, and a third repository 180. The processing engine 150 applies the query processing rules on the user posted query and further configured to retrieve corresponding data from the first repository 160, a second repository 170, and a third repository 180 to be displayed to the foundry user in a user readable format on his/her user interface module 110.

Referring to FIG. 2 illustrates a block diagram encompassing the functionality modules of the system 200 for optimization of sand for the purpose of reducing casting rejections in a foundry. In accordance with the present disclosure, the system 200 involves a first repository 210, a second repository 220, a third repository 230, an input module 240, a processor module 250, a pattern forming engine 260, a prescriptive-predictive module 270, a self-learning editor 280, and a display module. The input module 240 receives user inputs entered by the foundry user using an input device such as a keyboard and/or mouse. The input module 240 validates the user inputs by checking whether the received user input value(s) corresponds to at least a sand parameter for an instance. Subsequently, the input module 240 communicates with the first repository 210 to store the user inputs received into the repository for future use and reference. The first repository 210 enabled to store a primary set of sand parameters and a secondary set of san parameters. Typically, the primary set of sand parameter is selected from the group consisting of Green Compression Strength (GCS), compact-ability index, moisture content, active clay, inert fines content, Loss On Ignition percent (LOI), permeability index, wet tensile strength, volatile matter content, grain fineness number (GFN or AFS), oolitics content and pH value of the prepared sand. Typically, the secondary set of sand parameter is selected from the group consisting of shatter index, sand to metal ratio, dry composition strength, return sand temperature at the mixer, core sand infiltration, specimen weight, friability index, cone jolt test, shear strength, deformation, stickiness, green tensile strength, hot strength, flow-ability, mould hardness, toughness, density, sinter point, durability, mould-gas evolution, metal penetration, air-set strength, mouldability, sieve distribution, grain shape, bentonite, M B value, gelling time, swelling capacity, and metal related parameters. Additionally, the metal related parameters includes carbon percentage, carbon equivalent, pouring temperature, pouring time, pouring rate, pouring height (or metallostatic height), inoculation procedure and metal chemistry.

In accordance with the present disclosure, the processor module 250 which is enabled to communicate with the first repository 210, the second repository 220, and the third repository 230 to store and retrieve data for the purpose of processing and analysis. The second repository 220 is adapted to store data pertaining to rejection type and rejection quantity. The processor module 250 having processing rules stored therein, and is enabled to correlate the parameter values, the primary set of sand parameters, the secondary set of sand parameters, the rejection types and the rejections. In addition, the processor module 250 is further enabled to provide correlation between the parameters values, the parameters, the rejections and the rejection types for each of the instances during which the foundry users uploads/enters data though the input module 240.

The pattern forming engine 260 is coupled with the processor module 250 and functions simultaneously along with the processor module 250. The pattern forming engine 260 having a set of pattern forming rules stored therein, and further pattern forming engine 260 is enabled to apply the pattern forming rules to determine at least a pattern based on the correlations of the parameter values, parameters, rejections, and rejection type received from the processor module 250. The pattern generated by the pattern forming engine 260 being at least a complex equation which takes into account each of the correlated data to form a complex multi-dimensional curve. The prescriptive-predictive module 270 communicates with the pattern forming engine 260 and the processor module 250 for receiving user inputs corresponding to the sand parameters entered by the foundry user in the given instance. The prescriptive-predictive module 270 is enabled to map the input values corresponding to the sand parameters into the complex equations and generates at least a predictive/prescriptive solution including a degree of probability. The degree of probability is a numeric representation of a degree of confidence corresponding to the newly generated predictive/prescriptive solution. The processor module 250 communicates with the third repository 230 to store the patterns generated using the sand parameters corresponding to the rejections.

The self-learning editor 280 is enabled to communicate with the pattern forming engine 260, the prescriptive-predictive module 270 and further comprises a temporary repository 282, a determinator 284, and a comparator 286. The self-learning editor 280 is enabled to store the multi-dimensional curve(s) generated by the pattern forming engine 260 into the temporary repository 282. The determinator 284 is enabled to determine the predicted/prescribed rejections and the rejection types present in the predictive/prescriptive solution. The comparator 286 is enabled to learn the determined predicted/prescribed rejections and the rejection types present in the predictive/prescriptive solution from the determinator 284 and is further enabled to compare as well as correct the predicted/prescribed values corresponding to the rejections and the rejection types input by the user. The self-learning editor 280 communicates with the third repository 230 to store and update the corrected values of the rejections and the rejection types corresponding to the predictive/prescriptive solution generated. In addition, the self-learning editor 280 is enabled to take an action related to the rejection of improbable rejections which includes determining, retaining, discarding, updating and storing the improbable rejections into the third repository 230.

The display module 290 communicates with the processor module 250 and the prescriptive-predictive module 270 to enable the foundry users to view the predictive/prescriptive solution including a degree of probability and the correlated data in a graphical representation in his/her user interface.

In accordance with the present disclosure, typically, the foundry user is required to enter at least the primary set of sand parameters to initiate processing and analysis of the parameter values by the system 200. In addition, this enables the system 200 to provide a desired predictive/prescriptive solution to be utilized by the foundry user for reducing casting rejection in the existing foundry.

Referring to FIGS. 3(a) and 3(b) illustrates the steps involved in a flowchart corresponding to the method 300 for implementing the system for optimization of sand for the purpose of reducing casting rejections in a foundry as illustrated in FIG. 2. The method 300 includes the following steps:

storing in a first repository, data pertaining to a set of primary sand parameters, wherein the parameters is selected from the group consisting of Green Compression Strength (GCS), compact-ability index, moisture content, active clay, inert fines content, Loss On Ignition percent (LOI), permeability index, wet tensile strength, volatile matter content, grain fineness number (GFN or AFS), oolitics content and pH value of the prepared sand 310;

storing in a second repository, data pertaining to rejection type and rejection quantity 320;

storing in a third repository, pattern generated using the parameter corresponding to the rejections 330;

mapping of the rejections related to the parameters corresponding to the day of the casting process 340;

inputting a current set of values corresponding to the parameters for an instance for which at least a prediction/prescription solution is desired 350;

correlating the current set of input values with the parameter values stored in the first repository, rejection value and rejection types stored in the second repository and the patterns stored in the third repository, and providing correlation between the parameter values, the parameters, the rejections, and the rejection type for each of the instance 360;

processing the correlated data and the parameters for determining at least a pattern in the correlated data 370;

deriving at least a multi-dimensional complex curve based on the pattern generated by processing at least a complex equation, wherein each of the multi-dimensional curve being a prescriptive/predictive solution to the pattern 380; and subsequently, fitting the current values of parameters to the closest fit of the curve derived by processing and mapping the current set of input values corresponding to the parameters into the complex equation to obtain the predictive/prescriptive rejection value including a degree of probability 390.

In accordance with the present disclosure, the step of storing data pertaining to the primary sand parameters further includes the step of storing data pertaining to a secondary set of sand and related metal casting parameters for reducing sand related casting are selected from the group consisting of shatter index, sand to metal ratio, dry composition strength, return sand temperature at the mixer, core sand infiltration, specimen weight, friability index, cone jolt test, shear strength, deformation, stickiness, green tensile strength, hot strength, flow-ability, mould hardness, toughness, density, sinter point, durability, mould-gas evolution, metal penetration, air-set strength, mouldability, sieve distribution, grain shape, bentonite, M B value, gelling time, swelling capacity, and metal related parameters.

In accordance with the present disclosure, the step of processing and mapping the complex equation to obtain the predictive/prescriptive rejection value further includes the step of displaying the predictive/prescriptive solution including a degree of probability and the correlated data which is graphically represented in a user readable format.

In accordance with the present disclosure, the step of processing and mapping the complex equation to obtain the predictive/prescriptive rejection value further includes the step of determining the predicted rejections and the rejection type present in the predictive/prescriptive solution and subsequently comparing and correcting the predicted values corresponding to the rejections and the rejection type with the actual rejections and rejection types input by the user In accordance with the present disclosure, the step of comparing and correcting the predicted values corresponding to the rejections and the rejection type with the actual rejections and rejection types input by the user further includes the step of storing and updating the corrected rejections and the rejection type present in the predictive/prescriptive solution into the third repository.

In accordance with the present disclosure, the step of determining the predicted rejections and the rejection type present in the predictive/prescriptive solution further includes the step of taking an action related to rejection of improbable rejections, wherein the action is selected from a group consisting of determining, retaining, discarding, updating and storing improbable rejections into the third repository.

Referring to FIG. 4 illustrating a schematic data flow diagram for the synthesis of a mathematical model using the model building module 140 as illustrated in FIG. 1, in accordance with the present disclosure. The model building module 140 includes a data cleaning module 140A, a data scaling module 140B, an cluster grouping module 140C, a cluster partitioning module 140D, a cluster reassigning module 140E, an analysis module 140F and a best-fit module 140G. The data cleaning module 140A is enabled to first check for the empty or null database entry corresponding to a particular sand parameter to perform a predetermined activity. The predetermined activity includes but is not limited to excluding of a data point for which rejection percentage value is missing. In one embodiment of the data cleaning module 140A is enabled to compute an average value corresponding to the sand parameter and enter the average value into the missing value place. In another embodiment of the data cleaning module 140A is enabled to insert an interpolated value in the place of missing value applying a linear interpolation method. The linear interpolation method can be applied between two known data points, a data set and for approximation. This methodology enables the data cleaning module 140A to fill-in the missing values and further discarding the unwanted data points thereby producing a cleaned-data set.

The cleaned-data set is received by the data scaling module 140B is enabled to determine and select a target range within the cleaned-data and further enabled to scale/normalize the target data in a range [0, 1] or [−1, 1]. The equation (1) used for scaling the target data is represented as:

$$x' = \frac{x - \min(x)}{\max(x) - \min(x)} \quad (1)$$

where x is an original value, x' is the scaled value or the normalized value. For example the selected data relates to the parameter Green Compression Strength (GCS) characterized within a range [1600, 2000]. The target data (x) is equals to 1750. The scaled value (x') for the target data point (x) is equals to 0.375 as per equation (1), the scaled value relies within the given range [0<0.375<1]. The output of the data scaling module 140B is termed as the scaled-data set. The cluster grouping module 140C receives the scaled-data set from the data scaling module 140B and is enabled to compute a output value for a parameter termed as Graded Distance index (GD-index) pertaining to the scaled-data set corresponding to each and every sand parameters. The GD-index is calculated by feeding data into the given equation (2):

$$GD_{index,c} = \frac{\sum_{i=1}^{N}(u_{i,1stmax} - u_{i,2ndmax})}{N} - \left(\frac{c}{N}\right) \quad (2)$$

where $GD_{index,c}$:—GD_index for 'c' cluster partitions
$u_{i,1stmax}$:—first maximum membership of $i^{th}$ point
$u_{i,2ndmax}$:—second maximum membership of $i^{th}$ point
N:—total number of data points
c:—optimal number of clusters The given data set is partitioned numerous times by increasing the number of clusters and at each cluster partitioning instance. Eventually, GD-index values are populated into the GD-index list. The cluster grouping module 140C is enabled to identify the maximum GD-index value from the list and determine the clusters corresponding to the identified GD-index value. The output of the cluster grouping module 140C is to achieve an optimal number of clusters (c*) for the given data set.

The cluster partitioning module 140D receives the given data set and the optimal number of clusters from the cluster grouping module 140C. Based on the optimal number of clusters (c*) the cluster partitioning module 140D is enabled to partition the given data set into (c*) fuzzy partitions using a clustering methodology such as fuzzy c-means clustering methodology, k-means clustering methodology, expectation-maximization methodology, flame clustering methodology and density-based spatial clustering of applications with noise (DBSCAN). In one embodiment of the cluster partitioning module 140D applies the fuzzy c-means clustering fuzzy c-means clustering methodology for cluster analysis. In cluster analysis, data clustering is a process of categorizing data elements under clusters or classes. This is done to ensure that data items belonging to a cluster are as similar as possible. Further, the data items in different clusters are as dissimilar as possible. The cluster partitioning module 140D utilizes measures such as distance, connectivity and intensity. In fuzzy clustering methodology, the data elements might belong to one or more clusters and membership levels associated with each data element. This indicates the strength of association between the data element and a particular cluster. The cluster partitioning module 140D utilizes fuzzy clustering methodology to assign membership levels to the data elements and learning the membership levels further assigns the data elements to one or more clusters.

The given equation (3), equation (4) and equation (5) are represented below that are utilized in fuzzy c-means clustering:

$$\theta_i^r = \frac{\sum_{j=1}^{N} (u_{ij}^{(r-1)})^q X_j}{\sum_{j=1}^{N} (u_{ij}^{(r-1)})^q} \quad (3)$$

$$u_{ij}^r = \frac{1}{\sum_{k=1}^{c} \left(\frac{d_{ij}}{d_{kj}}\right)^{\frac{2}{q-1}}} \quad (4)$$

$$\| u^r - u^{(r-1)} \| \geq tol \quad (5)$$

where $X_j$—$j^{th}$ data point, q—fuzzifier, $u_{ij}$—membership of $j^{th}$ data point towards $i^{th}$ cluster and N—total number of data points.

The method followed by the cluster partitioning module 140D to implement the fuzzy c-means clustering methodology includes the following steps:

Step 1: freezing the number of clusters (c*) and tolerance value (tol) i.e. tol=0.0001 number value;
Step 2: generating initial (c*) cluster centers;
Step 3: initializing iterative index (r), where r=1, 2, 3 . . . ;
Step 4: updating the cluster centers and computing the membership values utilizing the aforementioned equation (3) and equation (4); and
Step 5: repeating the aforementioned steps from Step 1 to Step 4 till the condition as disclosed in the equation (5) is satisfied.

In accordance with the present disclosure, the cluster partitioning module 140D communicates the clusters identified and membership levels assigned to the cluster reassigning module 140E.

The cluster reassigning module 140E is enabled to compare the data points in the clusters with a threshold value of the data point and discard the clusters with data points less than the threshold value. In addition, the cluster reassigning module 140E is enabled to reassign the data points of the discarded clusters to the remaining set of clusters.

The remaining clusters in the given data set are fed into the analysis module 140F for further analysis of the clusters. In one embodiment, the analysis module 140F utilizes principal component analysis methodology which converts the data points in the given cluster of correlated parameters into a set of data points of linearly uncorrelated parameters termed as principal components. This is done by implementing orthogonal transformation matrix, where the data points of the given cluster are arranged in a matrix. The number of principal component is less than or equal to the number of original parameters. The method for analyzing a cluster utilizing the principal component analysis methodology involves the following steps:

Step 1: initializing a variable (x) corresponding to the data set containing all the data points of a cluster and size of (x) can be represented in a (m×n) matrix, where (m) is the number of input properties and (n) represents the number of data points;
Step 2: computing a mean value (or average value) for each input property;
Step 3: subtracting the computed mean value from each value of this input property in (x);
Step 4: repeating Step 3 all input properties and forming a (m×n)' mean matrix of the (m×n) matrix;
Step 5: computing the covariance of each element in the (m×n)' matrix and forming a (y×z) covariance matrix; and
Step 6: calculating the Eigen vectors for each element present in the (y×z) covariance matrix to form a (y×z)' mean-covariance matrix.

In accordance with the present disclosure, the mean co-variance matrices are computed for the transformed data set. Each cluster is characterised by a normal distribution with these mean and covariance values. The mean of the $i^{th}$ element in the matrix ($m_i$) is computed by using the equation (6):

$$m_i = \frac{1}{N} \sum_{j=1}^{N} x_{i,j} \quad (6)$$

The value of the covariance matrix at $j^{th}$ row and $k^{th}$ column is computed by using the equation (7):

$$q_{jk} = \frac{1}{N-1} \sum_{i=1}^{N} (x_{ij} - x'_j) * (x_{ik} - x'_k) \quad (7)$$

The output of the analysis module 140F for analysis of the cluster using principal component analysis and further computing the mean and covariance matrices formed by using equation (6) and equation (7) are fed into the best-fit module 140G. The best-fit module 140G is enabled to implement a linear regression methodology on the computed the mean-covariance matrix. This is done for relating the input properties of the data set and output properties of the data set. The best-fit module 140G is enabled to build a linear model for each of the clusters by taking into account the cleaned-data set, the scaled-data set, the data set retrieved after cluster analysis and the output data set. The coefficients of this linear regression model are obtained by using an equation (8):

$$\beta = (X^T X)^{-1} (X^T Y) \quad (8)$$

The best-fit module 140G produces best-fit model that illustrates the probability distribution of the data points corresponding to the sand parameters in the given data set.

Referring to FIGS. 5(a) and 5(b) illustrating website screen shots of an embodiment of present disclosure with an example of foundry data input and data output for a parameter rejection predictor module 500 to be utilized by the processing engine 150 of FIG. 1 and the processor module 250 of FIG. 2. The foundry user accessing the computer implemented system for optimization of the sand for the purpose of reducing casting rejections via a computer, the foundry user enabled to provide input through the input screen FIG. 5(a) and is enabled to view the output corresponding to the input provided in the output screen FIG. 5(b) of the parameter rejection predictor module 500. The foundry user is enabled to select at least line-name 510 from a drop down menu, a component-name 520 from a drop down menu relating to the desired component to be manufactured, a parameter-selector 530 to enable the user to select desired one or more parameters from parameter-list displayed in the drop down menu, a value-inputting section 540 to enable the user to input desired values corresponding to the parameters selected, a rejection-selector 550 to enable the user to select one or more rejections from the rejection type list displayed in the drop down menu, and a date section 560 to enable the user to mention date for which the user desire to compute the rejections percentage received in his/her foundry. Once the user presses on the search button 570 the parameter rejection predictor module 500 initiates an internal computations of the rejections received on the date mentioned corresponding to all the user inputs received. The output generated by the parameter rejection predictor module 500 which includes an input-summary section 570 displaying the brief summary of the user inputs provided at the first place and a rejection-predictor section 590 displaying a rejection percentage and a confidence percentage. The parameter rejection predictor module 500 applies Mahalanobis distance methodology for computing the confidence percentage. The equation (9) used for computing the confidence percentage:

$$D_M(x) = \sqrt{(x-\mu)^T S^{-1} (x-\mu)} \quad (9)$$

where a multivariate random variable $(x) = (x^1, x^2, x^3, \ldots x_N^T)$ from a group of values with a mean $(\mu) = (\mu^1, \mu^2, \mu^3, \mu_N^T)$ and a covariance matrix (S).

In accordance with the present disclosure, the parameter rejection predictor module 500 utilizes at least one of the modules of the model building module 140 illustrated in FIG. 4.

Referring to FIGS. 6(a) to 6(d) illustrating website screen shots of an embodiment of present disclosure with an example of data input and data output for a parameter neighborhood locator module 600 to be utilized by the processing engine 150 of FIG. 1 and the processor module 250 of FIG. 2. The foundry user accessing the computer implemented system for optimization of the sand for the purpose of reducing casting rejections via a computer, the foundry user enabled to provide input through the input screen FIG. 6(a) and is enabled to view the output corresponding to the input provided in the output screen FIGS. 6(b) to 6(d) of the parameter rejection predictor module 600. The parameter neighborhood locator module 600 enabled to locate the requested/desired number of data points in given data set stored into a database repository that are in the neighborhood of the input parameter values provided by the user. By using parameter neighborhood locator module 600 the foundry user is enabled to arrive at a range of rejection percentage values that can be observed when the selected foundry line and component is operated with the input parameter values entered by the user, further the user can zero down the information to the nearest number of rejection prediction he/she desire to view, for example five. The foundry user is enabled to select at least line-name 605 from a drop down menu, a component-name 610 from a drop down menu relating to the desired component to be manufactured, a date section 615 to enable the user to mention date range and/or a particular data for which the user desire to compute neighborhood rejections, a parameter-selector 620 to enable the user to select desired one or more type-I parameters from parameter-list displayed in the drop down menu, a value-inputting section 625 to enable the user to input desired values corresponding to the parameters selected, a rejection-selector 630 to enable the user to select one or more rejections from the rejection type list displayed in the drop down menu, and an optional-selector 635 to enable the user to select checkin/text optional type-II parameters from the list. The rejection-selector 630 further enables the user to select/provide rejection range and the corresponding rejection value desired by the user. The optional-selector 635 includes type-II parameters from the list which includes but is not limited to hide decimal, dual Y, hide legend, values, trend-lines, difference, average, median, hide tooltip, number of the nearest predictions and percentage of closeness. Alternatively, if all the user input data are provided within the specified distance percentage, the user can select the percentage of closeness and specify the distance percentage in the adjacent text box. The user is enabled to make addition or removable of parameters and/or parameter values as per his/her requirement in the list. Once the user presses on the search button 640 the parameter neighborhood locator module 600 initiates an internal computations of the neighborhood rejections received and the corresponding neighborhood parameter values on the date mentioned corresponding to all the user inputs received. The distance percentage value provided by the user enables the parameter neighborhood locator module 600 to limit the radius of the neighborhood data points in the given data set. For example, if the distance percentage value provided by user is five as an input, the parameter neighborhood locator module 600 computes the distance between the farthest points (maximum distance) in the given data set and utilizes five percent (5%) of this maximum distance as the radius to define the neighborhood region/range. The output generated by the parameter neighborhood locator module 600 which includes an input-summary section 645 displaying the brief summary of the user inputs provided at the first place, a neighborhood range section 650 displaying the numeric range values corresponding to the user selected type-I parameters that lead to the rejection type selected in the user input section, a neighborhood rejections section 655 displaying the neighborhood rejection percentages received corresponding to each day within the selected date range, a neighborhood input parameter section 660 displaying a list of parameter values corresponding the number of neighborhood rejections found in the database along with the dates and a graphical representations 665 depicting the nature of the parameters contributing to the rejections based on the corresponding parameters values. The data displayed in the neighborhood range section 650, the neighborhood rejections section 655, and the neighborhood input parameter section 660 either corresponds to the number of data points selected by the user or the data points within the vicinity of the input point which are present within a selected distance percentage. The data displayed in the neighborhood rejections section 655 and the neighborhood input parameter section 660 are arranged in the increasing order of their distance from the input point.

In accordance with the present disclosure, the parameter neighborhood locator module 600 utilizes at least one of the modules of the model building module 140 illustrated in FIG. 4.

Referring to FIGS. 7(*a*) to 7(*b*) illustrating website screen shots of an embodiment of present disclosure with an example of data input and data output for a parameter anchor rejection predictor module 700 to be utilized by the processing engine 150 of FIG. 1 and the processor module 250 of FIG. 2. The foundry user accessing the computer implemented system for optimization of the sand for the purpose of reducing casting rejections via a computer, the foundry user enabled to provide input through the input screen FIG. 7(*a*) and is enabled to view the output corresponding to the input provided in the output screen FIG. 7(*b*) of the parameter anchor rejection predictor module 700, The foundry user is enabled to selects at least line-name 705 from a drop down menu, a component-name 710 from a drop down menu relating to the desired component to be manufactured, a date section 715 to enable the user to mention date for which the user desire to compute neighborhood rejections, a parameter-selector 720 to enable the user to select desired one or more parameters from parameter-list displayed in the drop down menu, a value-inputting section 725 to enable the user to input desired values corresponding to the parameters selected, and a rejection-selector 730 to enable the user to select one or more rejections from the rejection type list displayed in the drop down menu. The user is enabled to make addition or removable of parameters and/or parameter values as per his/her requirement in the list. Once the user presses on the search button 735 the parameter anchor rejection predictor module 700 initiates an internal computations of the rejections received on the date mentioned corresponding to all the user inputs received. The output generated by the parameter anchor rejection predictor module 700 which includes an input-summary section 740 displaying the brief summary of the user inputs provided at the first place, a rejection-predictor section 745 displaying a rejection percentage and a confidence percentage, and a parameter-suggestion section 750 displaying the numeric suggestion values to the remaining parameters not selected by the user at the parameter-selector 720 corresponding to the parameter values provided at the value-inputting section 725. The parameter anchor rejection predictor module 700 enables the foundry user to anchor or freeze the parameters with respect to the specified values and further suggests numeric values to the remaining parameters in a manner that the resulting rejection percentage will be lowest with the highest possible confidence percentage.

In accordance with the present disclosure, the parameter anchor rejection predictor module 700 utilizes at least one of the modules of the model building module 140 illustrated in FIG. 4.

Referring to FIGS. 8(*a*) to 8(*b*) illustrating website screen shots of an embodiment of present disclosure with an example of data input and data output for a lowest-high rejection locator module 800 to be utilized by the processing engine 150 of FIG. 1 and the processor module 250 of FIG. 2. The foundry user accessing the computer implemented system for optimization of the sand for the purpose of reducing casting rejections via a computer, the foundry user enabled to provide input through the input screen FIG. 8(*a*) and is enabled to view the output corresponding to the input provided in the output screen FIG. 8(*b*) of the lowest-high rejection locator module 800. The lowest-high rejection locator module 800 enabled to provide the users with the highest values and the lowest values for a given rejection type within a given maximum and minimum range and within a given time period. The foundry user is enabled to select at least line-name 805 from a drop down menu, a component-name 810 from a drop down menu relating to the desired component to be manufactured, a date section 815 to enable the user to mention date range and/or a particular data for which the user desire to compute the rejections received corresponding to rejection type, a first parameter-selector 820 to enable the user to select desired one or more type-I parameters from parameter-list displayed in the drop down menu, a value-inputting section 825 to enable the user to input desired values corresponding to the parameters selected, a rejection-selector 830 to enable the user to select one or more rejections from the rejection type list displayed in the drop down menu, and a second parameter-set 835 to enable the user to provide numeric values for type-II parameters from the list. The rejection-selector 830 further enables the user to select/provide rejection range and the corresponding rejection value desired by the user. The second parameter-set 835 includes type-II parameters from the list which includes but is not limited to rejection lower bound value and rejection upper bound value. If multiple rejection types are selected, the user is required to specify the rejection lower bound value and rejection upper bound value for each of rejection type selected at the rejection-selector 830. The user is enabled to make addition or removable of parameters and/or parameter values as per his/her requirement in the list. Once the user presses on the search button 840 the lowest-high rejection locator module 800 initiates an internal computations of the neighborhood rejections received within the given range of highest and lowest rejections specified by the user. The output generated by the lowest-high rejection locator module 800 which includes an input-summary section 845 displaying the brief summary of the user inputs provided at the first place, a lowest-parameter value section 850 displaying the values corresponding to the given list of parameters at which the casting rejection attained corresponds to rejection lower bound value specified by the user, and a highest-parameter value section 855 displaying the values corresponding to the given list of parameters at which the casting rejection attained corresponds to rejection upper bound value specified by the user.

In accordance with the present disclosure, the lowest-high rejection locator module 800 utilizes at least one of the modules of the model building module 140 illustrated in FIG. 4.

Referring to FIGS. 9(a) to 9(d) illustrating website screen shots of an embodiment of present disclosure with an example of data input and data output for a significant parameter predictor module 900 to be utilized by the processing engine 150 of FIG. 1 and the processor module 250 of FIG. 2. The foundry user accessing the computer implemented system for optimization of the sand for the purpose of reducing casting rejections via a computer, the foundry user enabled to provide input through the input screen FIG. 9(a) and is enabled to view the output corresponding to the input provided in the output screen FIGS. 9(b) and 9(d) of the significant parameter predictor module 900. The significant parameter predictor module 900 is enabled to provide a list of parameters that has influence on the rejection types and suggests the input parameter values that can be considered by the foundry user while casting is taking place in his/her foundry.

The foundry user is enabled to select at least line-name 905 from a drop down menu, a component-name 910 from a drop down menu relating to the desired component to be manufactured, a date section 915 to enable the user to mention date range and/or a particular data for which the user desire to compute the parameter values influencing a given rejection type, a parameter-selector 920 to enable the user to select desired one or more type-I parameters from parameter-list displayed in the drop down menu, a value-inputting section 925 to enable the user to input desired values corresponding to the parameters selected, a rejection-selector 930 to enable the user to select one or more rejections from the rejection type list displayed in the drop down menu, and an optional-selector 935 to enable the user to select check-in/text optional type-II parameters from the list. The rejection-selector 930 further enables the user to select/provide rejection range and the corresponding rejection value desired by the user. The optional-selector 935 includes type-II parameters from the list which includes but is not limited to hide decimal, dual Y, hide legend, values, trend-lines, difference, average, median, and hide tooltip. Once the user presses on the search button 940 the significant parameter predictor module 900 initiates an internal computations of the parameters and the parameter values contributing to the rejections. The user is enabled to make addition or removable of parameters and/or parameter values as per his/her requirement in the list. The output generated by the significant parameter predictor module 900 which includes an input-summary section 945 displaying the brief summary of the user inputs provided at the first place, a first heat map section 950 displaying a heat map for total sand rejection quantity percentage based on the given data set, a second heat map section 955 displaying the optimum rejections that be achieved if the displayed parameter values are utilized while casting in the foundry, and a third heat map section 960 displaying lowest rejections achieved based on the specified input. The first heat map section 950 displays the parameters involved in total sand rejection quantity percentage along with their numeric weightage associated with a positive (+) sign or a negative (−) sign. Further, the first heat map section 950 represents the relationship between the parameters and the rejections in a given data set. The parameters displayed in the first heat map section 950 are arranged in the decreasing order of their influence on the selected rejection type.

The second heat map section 955 displays the values corresponding to the selected parameters in a first tuple and current/optimal values predicted corresponding to the parameters in a second tuple. The optimal values predicted corresponding to the parameters relates to high confidence percentage and lowest rejection percentage value. The rejection percentages for both the current and optimal values are computed by using the predictive model built using the selected foundry line, component and the rejection type. The third tuple displayed in the second heat map section 955 corresponds to the difference between the selected parameter values or user inputs and the optimal predicted parameter values along with a positive (+) sign or a negative (−) sign. The positive (+) sign indicates a direct co-relation between the input parameters and the rejection. The negative (−) sign indicates an inverse co-relation between the input parameters and rejection. The values of the parameters represent the values that the parameters could be moved to achieve optimum rejection. In the second heat map section 955 the parameters are arranged based on:

parameter influence on rejection type and
amount of change occurred (when compared with the optimal values) in the parameter—as illustrated in the third tuple.

In the second heat map section 955 the parameter displayed in the first column can bring in the maximum reduction in the rejection percentage of the selected rejection type when compared with the remaining parameters. The second heat map section 955 is enabled to suggest the foundry user to consider optimal values of the parameters that's results in lowest numeric value of the rejection percentage for the given set of parameters in a computed optimum region. The optimum region relates to the region where the rejections correspond to the lowest value in the computed cluster of the given data set. The third heat map section 960 displays the values corresponding to the selected parameters in a first tuple and lowest rejection achieved values corresponding to the parameters in a second tuple. The third tuple displayed in the third heat map section 960 corresponds to the difference between the selected parameter values or user inputs and the lowest rejection achieved parameter values along with a positive (+) sign or a negative (−) sign. The positive (+) sign indicates a direct co-relation between the input parameters and the rejection. The negative (−) sign indicates an inverse co-relation between the input parameters and rejection. The values of the parameters represent the values that the parameters could be moved to achieve optimum rejection. In the third heat map section 960 the parameters are arranged based on:

parameter influence on rejection type and
amount of change occurred (when compared with the optimal values) in the parameter—as illustrated in the third tuple.

The lowest rejection refers to the least non-zero rejection value that was ever achieved in the given data set. If the foundry selects multiple rejection types at the rejection-selector 930 while provide user inputs the significant parameter predictor module 900 is enabled to compute the first heap map section 950, the second heat map section 955, and the third heat map section 960 for each of the rejection type selected by the user. In an embodiment of the significant parameter predictor module 900 the aforementioned computed analytics can be represented in a graphical manner or in a pictorial manner to provide better understanding of the parameters and their corresponding values impacting the rejection percentages and the rejections types in a user readable format.

In accordance with the present disclosure, the significant parameter predictor module 900 utilizes at least one of the modules of the model building module 140 illustrated in FIG. 4.

Referring to FIGS. 10(a) to 10(b) illustrating website screen shots of an embodiment of present disclosure with an example of data input and data output for a rejection heat map module 1000 to be utilized by the processing engine 150 of FIG. 1 and the processor module 250 of FIG. 2. The foundry user accessing the computer implemented system for optimization of the sand for the purpose of reducing casting rejections via a computer, the foundry user enabled to provide input through the input screen FIG. 10(a) and is enabled to view the output corresponding to the input provided in the output screen FIG. 10(b) of the rejection heat map module 1000. The foundry user is enabled to select at least line-name 1005 from a drop down menu, a component-name 1010 from a drop down menu relating to the desired component to be manufactured, and a rejection-selector 1015 to enable the user to select one or more rejections from the rejection type list displayed in the drop down menu. The user is enabled to make addition or removable of parameters and/or parameter values as per his/her requirement in the list. Once the user presses on the search button 1020 the rejection heat map module 1000 initiates an internal computations to determine the relationships between the parameters and the rejection type based on analysis of the given data set in entirety. The output generated by the rejection heat map module 1000 which includes an input-summary section 1025 displaying the brief summary of the user inputs provided at the first place, a first heat map section 1030 displaying a heat map for total sand rejection quantity percentage based on the given data set, and a second heat map section 1035 displaying the blow hole machining stage percentage for the given data set. The parameters along with their weightage displayed in the first heat map section 1030 and in the second heat map section 1035 are arranged in the decreasing order of their (parameter) influence on the rejection type. The numeric weightage value corresponding to the parameters are displayed in a positive (+) sign and a negative (−) sign. The positive (+) sign indicates a direct co-relation between the input parameters and the rejection. The negative (−) sign indicates an inverse co-relation between the input parameters and rejection.

In accordance with the present disclosure, the parameters contributing to the rejections and further leading to a particular rejection type are described herein below. The rejection type is selected from the group consisting of broken mold/mould, blow hole machining and foundry stage, pin hole machining and foundry stage, sand fusion, burn on, erosion, sand drop, inclusion foundry & machining stage, metal penetration, scabbing, swelling/oversize casting, expansion scab, explosive penetration, lustron carbon defect, rough surface and rat tail.

In an embodiment of the present disclosure, to minimize casting rejections relating to the broken mold/mould rejection type, the foundry user required to configure the following parameters:
 Improve Green tensile strength
 Improve green shear strength
 Improve GCS
 Improve impact strength
 Improve Mouldability
 Improve mixer efficiency In an embodiment of the present disclosure, to minimize casting rejections relating to the blow hole machining and foundry stage rejection type, the foundry user required to configure the following parameters:
 Decrease GFN
 Increase in Permeability
 Decrease in Moisture
 Reduce binder Gas generation
 Increase in VM
 Increase venting
 Use dry cores
 Reduce inert fines.

In an embodiment of the present disclosure, to minimize casting rejections relating to the pin hole machining and foundry stage rejection type, the foundry user required to configure the following parameters:
 Sand related parameters contributing to the pin hole machining and foundry stage rejection type—
  Increase in Permeability
  Decrease in Moisture
  Use Iron oxide as additive.
 Metal (Non Sand) related parameters contributing to the pin hole machining and foundry stage rejection type—
  Low pouring temperature
  Unclean Metal (Slag)
  Oxidized Metal
  Excessive Mg in SG Iron
  High Nitrogen content in Metal/Binder/LCA—
  Imbalance in Mn-Sulphur Ratio In an embodiment of the present disclosure, to minimize casting rejections relating to the sand fusion rejection type, the foundry user required to configure the following parameters:
 Increase sintering/Fusion point of sand
 Reduce Permeability
 Increase flowability
 Increase VM
 Improve Bentonite Quality with low iron content (Fe2O3)

In an embodiment of the present disclosure, to minimize casting rejections relating to the burn on rejection type, the foundry user required to configure the following parameters:
 High degree of oolitisation
 Use higher Lustrous Carbon LCA In an embodiment of the present disclosure, to minimize casting rejections relating to the erosion rejection type, the foundry user required to configure the following parameters:
 Low GCS
 Low Compactability
 High Inert Fines
 Low GFN no
 Low lustrous carbon
 High salt content of water In an embodiment of the present disclosure, to minimize casting rejections relating to the sand drop rejection type, the foundry user required to configure the following parameters:
 Increase GCS
 Increase Mould Hardness
 Use of special additives to improve GCS and mould hardness—
 Avoid mechanical damage to mould.

In an embodiment of the present disclosure, to minimize casting rejections relating to the inclusion foundry & machining stage rejection type, the foundry user required to configure the following parameters:
 Increase GCS
 Increase Dry Strength
 Increase moisture
 Increase Compactability
 Increase mixing time
 Reduce inert fines
 Reduce lustron carbon former In an embodiment of the present disclosure, to minimize casting rejections relating to the metal penetration rejection type, the foundry user required to configure the following parameters:
Reduce Compactability
Increase GFN
Reduce degree of oolitisation
Increase addition of new good quality of silica sand
Increase quantity of Lustrous carbon produce LCA with greater coke formation In an embodiment of the present disclosure, to minimize casting rejections relating to the scabbing rejection type, the foundry user required to configure the following parameters:
Increase wet tensile strength
Increase Active Clay
Increase inert fines
Increase GCS
Use wider grain size distribution sand
Increase mixing time
Improve bentonite activation
Reduce quantity of new sand in mix
Reduce salinity (salt) of water In an embodiment of the present disclosure, to minimize casting rejections relating to the swelling/oversize casting rejection type, the foundry user required to configure the following parameters:
Improve mould Hardness
Reduce Compactability
Increase fixed carbon in LCA In an embodiment of the present disclosure, to minimize casting rejections relating to the expansion scab casting rejection type, the foundry user required to configure the following parameters:
Improve wet tensile strength
Reduce Moisture
Reduce dry strength caused by excessive sand expansion Suggestions-Use better quality of Bentonite requiring lower moisture-High degree of activation In an embodiment of the present disclosure, to minimize casting rejections relating to the lustron carbon defect rejection type, the foundry user required to configure the following parameters:
Reduce Lustrous Carbon in LCA
Improve permeability
Reduce GFN
Increase Core Venting
Reduce core gas generation In an embodiment of the present disclosure, to minimize casting rejections relating to the rough surface rejection type, the foundry user required to configure the following parameters:
Increase GFN
Increase Lustrous Carbon in LCA
Increase Inert Fines
Reduce Compactability
Reduce Friability In an embodiment of the present disclosure, to minimize casting rejections relating to the rat tail rejection type, the foundry user required to configure the following parameters:
Reduce hot strength caused by poor thermal stability of sand.
To Reduce Excessive Sand expansion use wood flour In accordance with the present disclosure, TABLE-1 represents a matrix illustrating the rejection received on the parameters trends. The rejection-parameters matrix illustrated aims to suggest the foundry user that how the trends in the parameters impacting to a rejection type:

Rejection Vs Parameters Trend Martix
(Increase or Decrease)
PARAMETERS

| REJECTIONS TYPES | GCS | Compactability | Active Clay | Inert fines | LOI | Moisture | Permeability | Wet Tensile Strength | Volatile Matter | GFN/AFS | Shear strength | Ph Value | Speciman weight | Oolitics | Clay balls |
|---|---|---|---|---|---|---|---|---|---|---|---|---|---|---|---|
| Burn on | ☐ | ☐ | ☐ | ☐ | ☐ | ☐ | ☐ | — | ☐ | — | — | — | — | ☐ | — |
| Erosion | ☐ | ☐ | ☐ | ☐ | ☐ | ☐ | ☐ | — | ☐ | ☐ | ☐ | — | — | — | — |
| Metal Explosive penetration | ☐ | ☐ | ☐ | ☐ | ☐ | ☐ | ☐ | — | ☐ | ☐ | — | — | — | ☐ | — |
| Blow hole machining/foundry stage | ☐ | ☐ | ☐ | ☐ | ☐ | ☐ | ☐ | — | ☐ | ☐ | — | — | — | — | ☐ |
| Pin holes | ☐ | ☐ | ☐ | ☐ | ☐ | ☐ | ☐ | ☐ | ☐ | ☐ | — | — | — | ☐ | — |
| Sand fusion | ☐ | ☐ | ☐ | ☐ | ☐ | ☐ | ☐ | ☐ | ☐ | ☐ | — | — | — | ☐ | — |
| Sand inclusion | ☐ | ☐ | ☐ | ☐ | — | — | — | — | — | ☐ | — | — | — | — | — |
| Scab (Erosion) | ☐ | ☐ | ☐ | ☐ | ☐ | ☐ | ☐ | ☐ | ☐ | ☐ | — | — | — | ☐ | — |
| Swelling (Scab) | ☐ | ☐ | ☐ | ☐ | — | ☐ | — | — | — | ☐ | — | — | — | — | — |
| Broken mould | ☐ | ☐ | ☐ | ☐ | — | ☐ | — | ☐ | — | — | ☐ | — | — | — | — |

In an embodiment of the present disclosure, to minimize casting rejections relating to the explosive penetration casting rejection type, the foundry user required to configure the following parameters:
Soft mould-Increase mould hardness
Reduce free moisture
Increase GFN
Increase flowability
Reduce inert fines
Reduce compatibility In accordance with the present disclosure, if the strength of the GCS of the sand is low then it resulting casting sand mixture may prone to sand erosion resulting in Sand Inclusion rejection type. The low percentage of the GCS may also lead to broken mould/mold and metal Penetration rejection types. However, if the percentage of the GCS is high, this may lead poor knockout of the poured moulds/molds.

In accordance with the present disclosure, the parameters compactability and mouldability both are used for temper tests for determining the sand properties. However, compactability and mouldability individually offer additional information on the various factors which influence the sand properties.

In accordance with the present disclosure, excessive moisture leads to steam formation and further contributes in receiving blowhole, pin hole, over size casting, rough finish, scabs, metal penetration and buckles and rattails rejection types.

In accordance with the present disclosure, if the percentage of the active clay is high then the active clay fills into the interstices which in turn lower the permeability rapidly. Further, excess of active clay decreases the flow-ability and increases moisture content needed for temper. Additional, the active clay flux which readily lowers the sintering point and impair the refractory qualities of sand due to high percentage of ferrous oxide (Fe2O3 content.

In accordance with the present disclosure, the parameter permeability contributes to the blow hole rejection type and inversely proportional to the rejection percentage.

In accordance with the present disclosure, the fineness of sand measured by the GFN/AFS percentage has direct impact on the parameters which includes permeability, casting surface finish and the achievable green strength properties.

In accordance with the present disclosure, the continuous recycling of the sand sometimes exhibits rejection types such as mould tear, erosion, scab and buckle and further exhibiting increasing tendency of rejections received. These rejections can be correlated to the change of the pH value of the sand from alkaline to acidic which may be the result of deterioration of the quality of bentonite used in sand molding/moulding. Further, this result in poor activation of bentonite which is rectified by reading the pH value and adding appropriate chemicals such as sodium carbonate that can help in changing the pH value and improve activation. Since, molding sand with low pH value (or exhibiting acidic nature) does not allow the alkaline exchange and reduces the property of bentonite to swell and increase in volume to cover higher area of sand grains there by affecting the GCS parameter.

In accordance with the present disclosure, the oolitics or the process of oolitalization reason out the factors why the molding sand usually has more favorable properties than all new moulding sands.

In accordance with the present disclosure, the parameter sand to metal ratio varies from casting to casting and has direct impact on the return sand parameters which includes return sand LOI, active clay content and temperature.

In accordance with the present disclosure, the parameter dry compression strength increase rapidly in a molding sand containing clay bond with increase moisture content. The high water content without clay renders a mixture ineffective as the water occupies space between the sand grain and voids are developed when the molds are dried.

In accordance with the present disclosure, due to the difference in the weight of the casting sand to metal ratio and the weight, the temperature of the return sand is variable and has pronounced effect on the sand being mixed and made ready for the next batch for casting.

In accordance with the present disclosure, the mold/mould characterized with non-uniform hardness is soft at certain points. The softness in the sand molds exhibits low flowability which results in enlargement of casting (swelling) and/or rough casting surface. This is particularly evident on the side vertical walls of the castings.

In accordance with the present disclosure, the cone jolt toughness testing is dynamic in nature as the failure is incremental with staged crack propagation. In the cone jolt test, a standard specimen is jolted while bearing the full weight of a cone penetrator and the number of jolts until failure is counted. This is very simple and fast sand testing technique and ideally suited for production environments. Failure in fewer than 30 jolts designates brittle sand. Sands that have not been re-mulled or reused are classed as brittle. Laboratory mixes rate between 14 and 18 jolts. The sands develop toughness as they are reused and re-mulled. A heavy influx of core sand can cause the sand composition and properties to resemble those of a brittle new sand or laboratory mix.

In accordance with the present disclosure, the deformation of the green sand increases rapidly if the sand is having moisture. The sand tempered to heavy or wet side readily allows swelling and results in over weight castings than sand temper to best working moisture content.

In accordance with the present disclosure, when the moisture evaporates the sand may be required to possess strength at elevated temperature, the hot strength of the sand increases as the moisture content increases, particularly in the lower temperature ranges in the neighborhood of 800 to 850 degree Celsius (° C.). Metallostatic pressure of the liquid or pliable raw material bearing against the mold walls may cause mold enlargement. Also, if the sand does not poses adequate hot strength then the liquid or pliable raw material poured into the mold may result erosion, cracks or breakage.

In accordance with the present disclosure, the mold hardness expected to be low/poor in case the sand sample exhibits dry bonding between sand particles. Since, the clay is not fully active for bonding thereby resulting in diminished resistance to the deforming force. When oversaturated the excess water causes the sand grains to slip because of weak binding force between the sand particles resulting in diminished resistance.

In accordance with the present disclosure, the parameters density and permeability are inversely proportional to each other i.e. higher the density lower is the permeability.

In accordance with the present disclosure, FIGS. 11(a) to 11(d) illustrates a first case study showing the website user interface related to the computer implemented system 100 for optimization of sand for the purpose of reducing casting rejections in a foundry of FIG. 1.

Figure 11A:
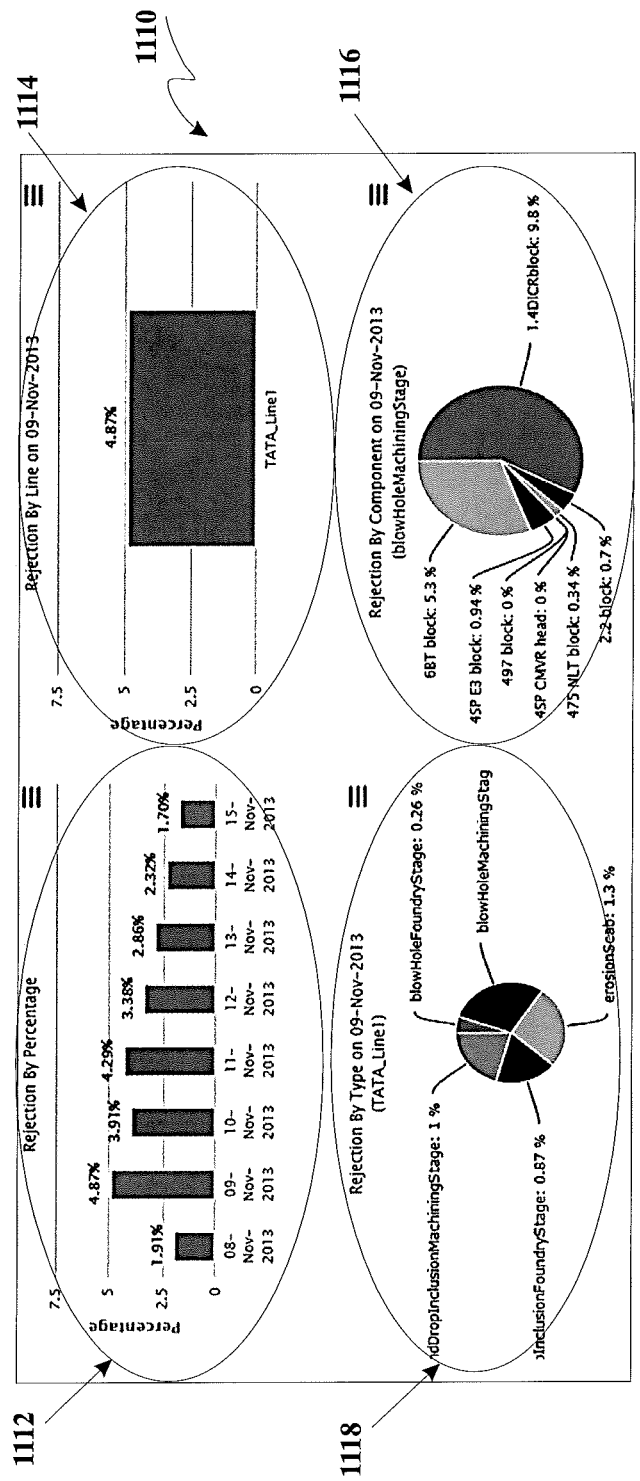

FIG. 11(a) illustrates a user dashboard section 1110 representing the performance of a given foundry having stored the foundry data set into the repositories. The user dashboard section 1110 further enables a foundry user to understand the performance of his/her foundry in a given or selected time period. The data sample selected herein in the case study belongs to the time period from 8 Nov. 2013 to 15 Nov. 2013. A model was build using the model building module 140 of FIG. 1 to study the foundry performance. The user dashboard section 1110 provides pictorial representation of the given data set which includes a rejection by percentage graph 1112 showing rejection percentage (y-axis) plotted with respect to the selected time period (x-axis), a rejection by line-on-date graph 1114 showing rejection percentage (y-axis) plotted with respect to the line number 1 (x-axis), a rejection by component-on-date graph 1116 is a pie-chart showing the rejection percentage with respect to the component-type, and a rejection by type-on-date graph 1118 is a pie-chart showing the rejection percentage with respect to the rejection type.

Figure 11B:
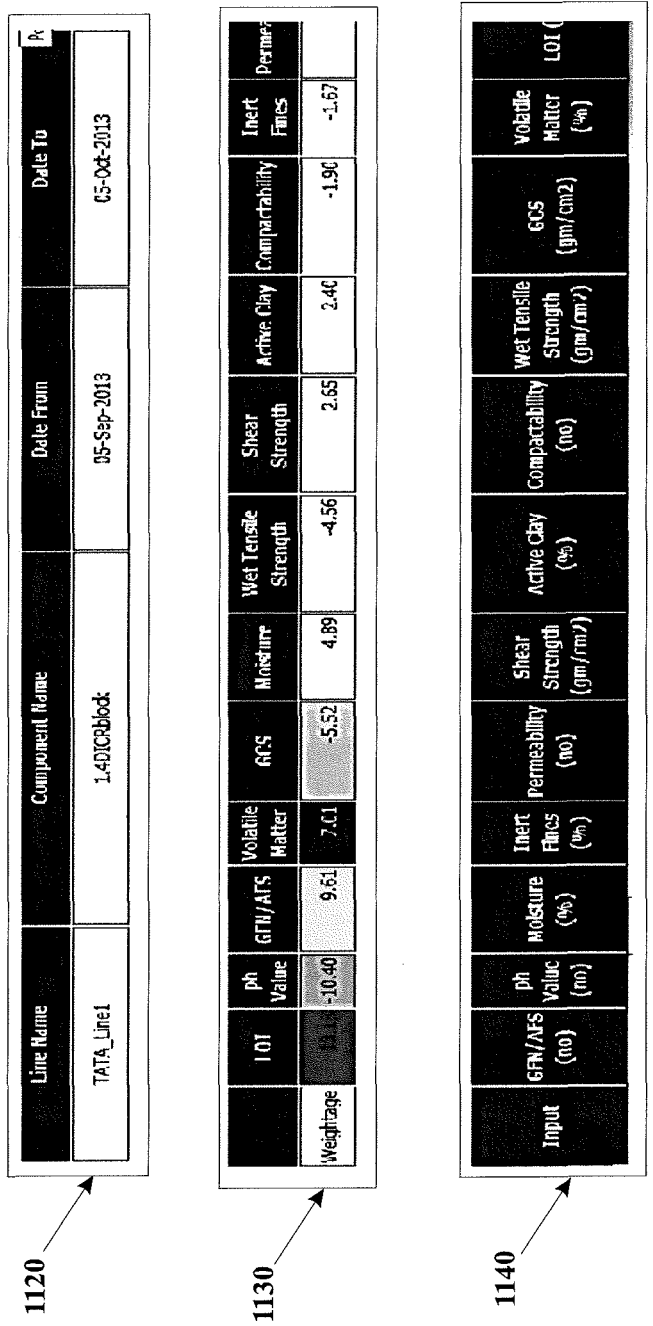
Figure 11C:
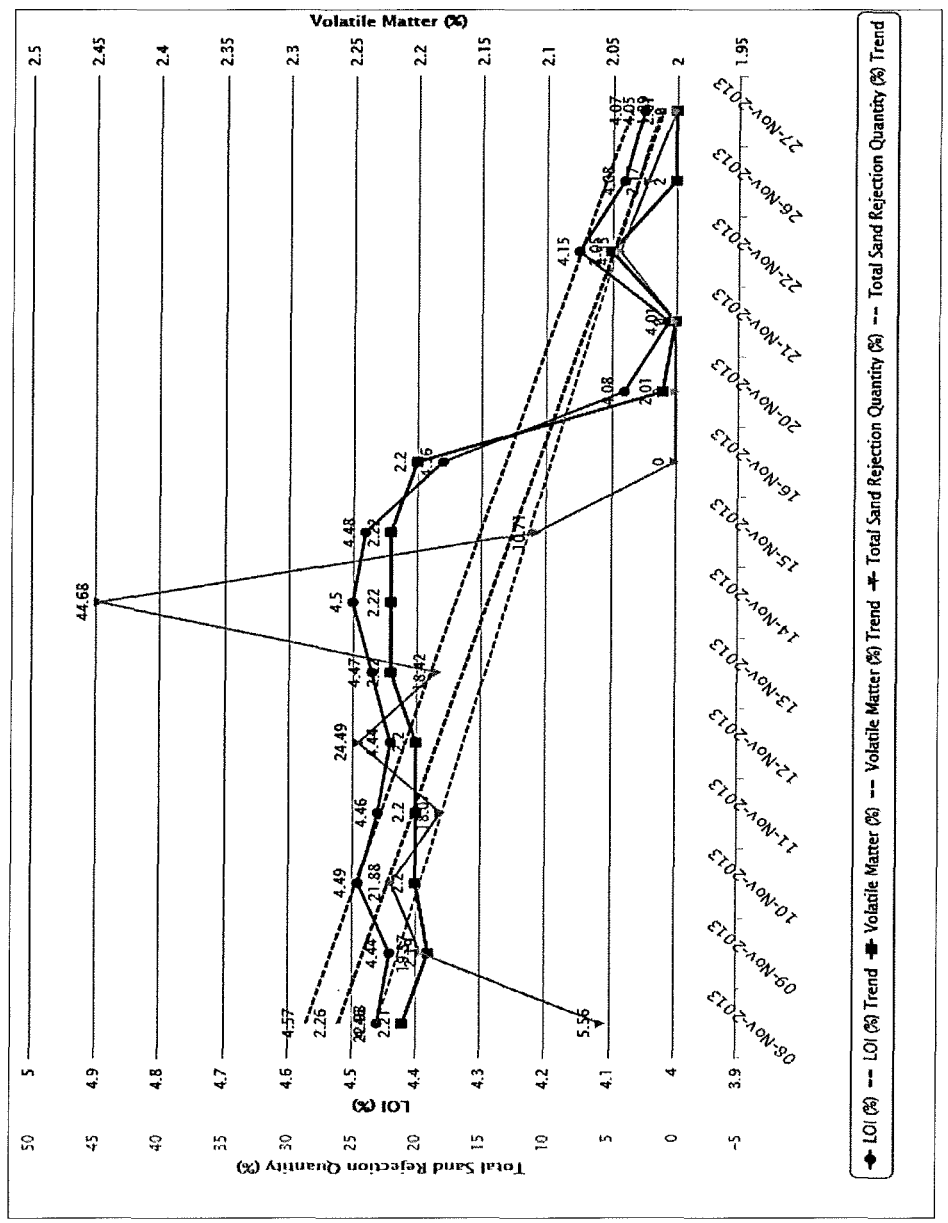

In accordance with the present disclosure, it is observed that the component-type 1.4DICRblock projects maximum rejection percentage value 9.8% in the rejection by component-on-date graph 1116 is further taken into consideration for analysis by using the significant parameter predictor module 900 of FIGS. 9(a) to 9(d). The user input provided into the significant parameter predictor module 900 are as follows:
  line number selected is 1;
  component block selected is 1.4DICRblock;
  time period selected is from 5 September to 5 October as the highest rejection percentage of 4.5% was recorded for this item on 15 Sep. 2013;
  all parameters were selected for the purpose of computation;
  rejection selected is Total rejection quantity for the purpose of computation;

On giving the "Search" command, the system produces a plurality of heat maps as illustrated in FIG. 11(b). The heat map produced based on the given data set indicated that the first five most significant parameters in order of weightage to reduce rejection percentage are as follows:
  LOI. - - - Reduce.
  pH value. - - - Increase.
  GFN/AFS No. - - - Decrease.
  V M - - - Reduce
  GCS - - - Increase This enables the foundry user to take the required action based on the above heat map and reduction of LOI/VM was implemented. Further, the action taken by the user resulted in reduction of rejection as is seen in a graph, illustrated in FIG. 11(c). The trend line of LOI/VM & rejection are represented as parallel line, therefore, validating the heat map recommendations provided by the system 100. According to FIG. 11(d) the sand data uploaded, the variation of the GCS and LOI parameters along with rejection is compared with trend lines. The trend of rejection is tabulated with trends of all parameters in TABLE-II. The first five major parameters found are compared with heat map indication as in weightage.

Figure 11D:
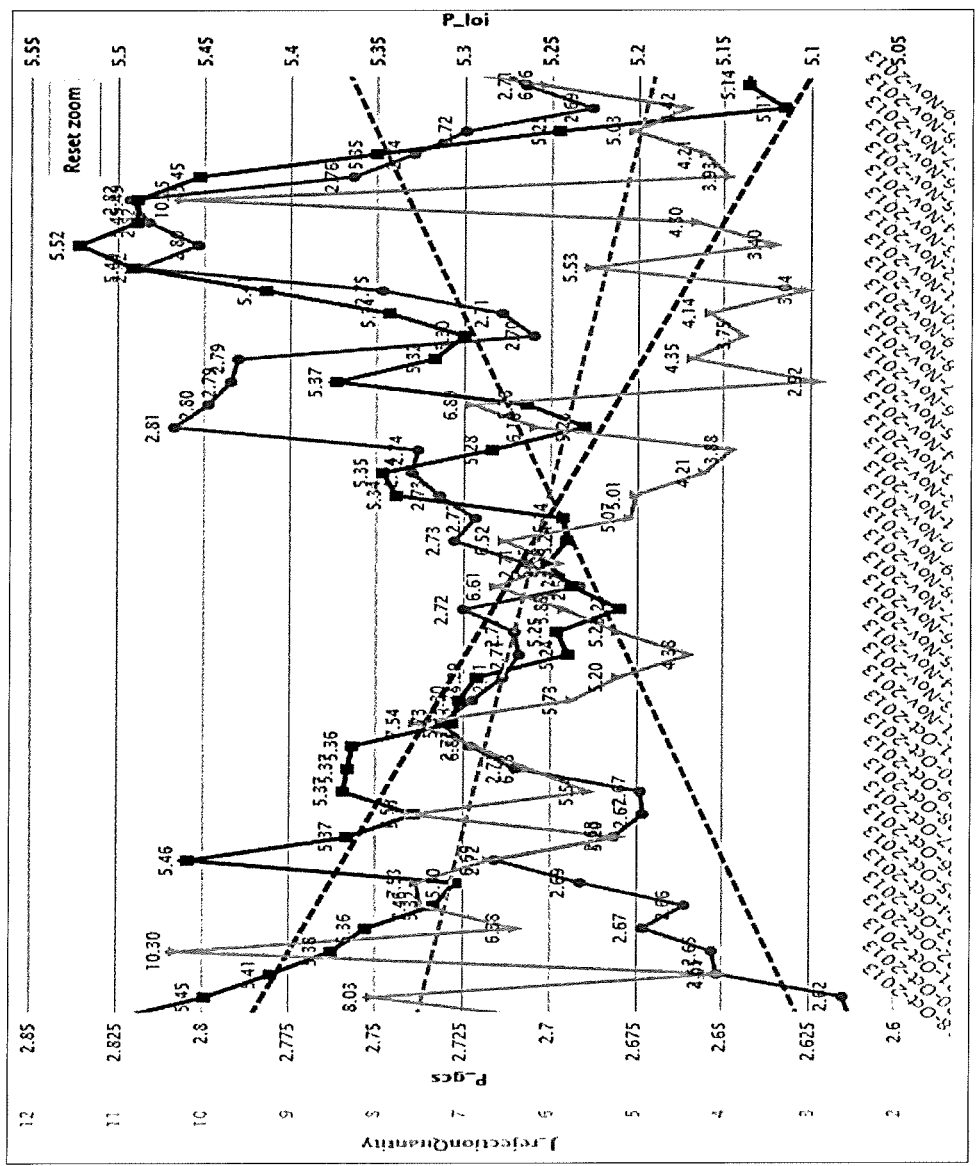

6 components do not have any effect as per the graph & trend lines
2. The output from rejection parameter also compared with the actual data and is validated
  5 most significant parameters exhibit same trend
  2 less significant parameters exhibit reverse trend
  7 components do not have any effect as per the graph & trend lines From the above examples it is evident that the predictions of the most significant influencing parameters from the algorithms are validated by the actual trend lines of the sand data and data visualization as illustrated in FIG. 11(d). This enables the foundry user to act on the predictions made by the system 100 with confidence to achieve process consistency and reduced rejections.

In accordance with the present disclosure, referring FIG. 12 illustrating is a data flow block diagram of the foundry components in a foundry 1200. The foundry 1200 includes a pre-mixing tank 1210, a mullor tank 1220, a mold forming chamber 1230, a mold filling chamber 1240, a mold and casting cooling chamber 1250, a mold separation breaking chamber 1260, a product collecting chamber 1265, a sand recovery chamber 1270, a sand cooler chamber 1280 and a dust recovery chamber 1290. For the preparation of casting mold for the purpose of manufacturing casted product/item, typically, sand or clay is mixed with a predetermined set of additives including bentonite in a predetermined composition percentage in the pre-mixing tank 1210 and the sand-additive mixture is fed into the mullor tank 1220. The sand-additive mixture is churned with water rigorously inside the mullor tank 1220 under a predetermined temperature and pressure. The churned mixture is further fed into the mold forming chamber 1230 where mold formation takes place using the churned mixture to construct casting molds with the desired product design and measurement. The mold filling chamber 1240 receives the mold formed in the mold forming chamber 1230 where a liquid or a pliable raw

TABLE II

| Sr No. | Foundry Sand Parameter | Trend Values From | Trend Values To | Trend Increase/ Decrease | Average | Historical data Recommendation | Relation with Heat Map | Lowest Rejection Parameters |
|---|---|---|---|---|---|---|---|---|
| 1 | GCS | 2570 | 2650 | ☐ | 2690 | −4.45 | Correct | + Correct |
| 2 | Compactability | 39 | 40.84 | ☐ | 39.87 | −2.36 | Correct | + Correct |
| 3 | Active Clay | 10.08 | 10.07 | — | 10.08 | | | + — |
| 4 | Wet Tensile Strength | 0.23 | 0.23 | — | 0.23 | 1.35 | ? | − — |
| 5 | LOI | 5.56 | 4.82 | ☐ | 5.26 | −1.67 | Correct | − — |
| 6 | Moisture | 3.84 | 3.83 | — | 3.83 | 0.59 | — | − — |
| 7 | Total Clay | 13.06 | 13.16 | ☐ | 13.1 | | | | |
| 8 | Inert Fines | 2.97 | 3.09 | ☐ | 3.02 | | | − X |
| 9 | VM | 3.12 | 3.06 | ☐ | 3.1 | −2.88 | X | − — |
| 10 | Specimen Wt | 143.13 | 143.87 | ☐ | 143.43 | −3.19 | Correct | + Correct |
| 11 | Permeability | 71.86 | 78.97 | ☐ | 75.17 | −2.59 | Correct | + Correct |
| 12 | Shear Strength | 476 | 484 | ☐ | 481.97 | 2.31 | X | + Correct |
| 13 | PH Value | 8.9 | 8.86 | — | 8.88 | | — | − — |
| 14 | AFS/GFN Trend | 62.46 | 62.4 | — | 62.1 | −1.67 | ? | + ? |
| 15 | Oolites | 1.13 | 1.18 | ☐ | 1.15 | 0.81 | X | − X |

Summary of the First Case Study:
1. The output from the rejection heat map based on historical data—
  5 most significant parameters exhibit same trend
  3 less significant parameters exhibit reversed trend material is poured into the casted molds. The liquid/pliable raw material easily fills in the hollow gap within the casted mold and further acquires the shape casted mold. The mold and casting cooling chamber 1250 received the filled casted mold from the mold filling chamber 1240 where the casted molds filled with the liquid/pliable raw material are cooled and fed into the mold separation breaking chamber 1260. The mold separation breaking chamber 1260 shakes the filled molds in a manner such that the casted mold breaks. The solidified liquid/pliable raw material turns into casted products which are collected into the product collecting chamber 1265. The used sand mixture used is received by the sand recovery chamber 1270 from the mold separation breaking chamber 1260 and further fed into the sand cooler chamber 1280 where the casted sand mixture is cooled. The dust recovery chamber 1290 is adapted collect dust particles from the sand cooler chamber 1280, the sand recovery chamber 1270 and the mold separation breaking chamber 1260.

In an embodiment of foundry 1200, the pre-mixing tank 1210 receives sand mixture from the sand cooler chamber 1280 for reusability of the return/recycled sand for the further casting procedures.

In accordance with present disclosure, the prepared sand resembles green in color obtained due to addition of additives, therefore also known as green sand/prepared sand.

In accordance with the present disclosure, in the pre-mixing tank 1210 the sand is mixed with the predetermined set of additives to prepare the sand for the purpose of making sand molds/moulds. The additives are selected from the group consisting of a cereal binder, a ground pitch, a sea coal, a gilsonite, a fuel oil, a wood flour, a silica flour, an iron oxide, a perlite, a molasses, a bentonite (calcium based), a bentonite (sodium based), a fireclay, a kaolin clay, an asphalt, a lamp black, a cellulose, a cob flour, a furfural residue, an oat hulls, a walnut shell flour, an asphalt emulsion, a kerosene, a soda ash, a wetting agent, a alumina, a chromite flour, a fly ash, an olivine flour, a staurolite flour, a zircon flour, a bran flour, a british gum, a lignin sulfate, a sodium silicate, and a wheat flour. The additives are added to the sand or active ingredient to the retrieve the prepared sand with the desired qualities for the purpose of preparing sand molds/moulds for casting in the foundry 1200.

In accordance with the present disclosure, the cereal binder used as an additive for preparing the sand for purpose of making sand casting molds, the cereal binder relates to binders such as finely ground corn flour, gelatinized ground corn starch, gelatinized substance, starch and combinations thereof. The cereal binder are used for preparing the sand for the purpose of molding can be in the range of percentages between 0.25 to 2.00 to increase the green or dry strength of the sand and further increases the resistance to collapsibility of the sand.

In accordance with the present disclosure, the ground pitch used as an additive for preparing the sand for purpose of making sand casting molds, the ground pitch is a by-product of coke making process, when the coke is distilled out from the soft coal around a temperature of about 350 Fahrenheit (° F.) or above. The ground pitch additive used can be of percentage amount of 20. The ground pitch if used with the given percentage amount improves the hot strength of the sand to be used for molding and also improves the casting finish relating to ferrous castings.

In accordance with the present disclosure, the sea coal used as an additive for preparing the sand for purpose of making sand casting molds, the sea coal relates to finely ground soft coal used in gray and malleable-iron molding sand castings. The main purpose of adding sea coal into the sand preparation is to improve the surface finish and ease of cleaning the castings. The amount of sea coal to be used can be determined by proximate and ultimate analyses which are typically used for the analysis of the coal.

In accordance with the present disclosure, the gilsonite used as an additive for preparing the sand for purpose of making sand casting molds, the gilsonite is a solid asphaltic mineral found in the mines of Utah and Colorado currently in United States of America. The gisonite mineral is generally volatile in nature and addition of gilsonite in sand preparation functions similarly like that of the sea coal additive. The gilsonite is used to improve the casting finish. The gisonite is a potent additive and can be used in the range of percentages between 0.40 to 0.80.

In accordance with the present disclosure, the fuel oil used as an additive for preparing the sand for purpose of making sand casting molds, the fuel oil used in small percentages as a replacement of water. The fuel oil additive lowers down the total percentage of moisture content in the prepared sand.

In accordance with the present disclosure, the wood flour used as an additive for preparing the sand for purpose of making sand casting molds, the wood flour is the proprietary grades of ground wood flour. The wood flour can be used in the range of percentages between 0.5 to 2.0 of the total sand percentage used for preparing the molds. The wood flour enhances the thermal stability of the sand. The wood flour functions as a cushion to control the expansion of the sand by burning out at elevated temperature. If the wood flour is used in sand preparation, amounts are added to keep about 5 to 8% of combustible matter in the sand.

In accordance with the present disclosure, the silica flour used as an additive for preparing the sand for purpose of making sand casting molds, the silica flour is pulverized silica which is finer than 200 meshes. It may be used in amounts up to 35% for the purpose of increasing hot strength of the sand.

In accordance with the present disclosure, the iron oxide used as an additive for preparing the sand for purpose of making sand casting molds, the iron oxide is used in form of fine dust. The red colored ferrous oxide ($Fe_2O_3$) is used in small percentages in the range of 0.25 to 1.00. This improves the hot strength of the sand.

In accordance with the present disclosure, the perlite used as an additive for preparing the sand for purpose of making sand casting molds, the perlite is an expanded aluminum silicate mineral. The perlite is used in the range of percentages between 0.5 to 1.50, to obtain better thermal stability of the sand. It may also be used as a riser insulator.

In accordance with the present disclosure, the molasses used as an additive for preparing the sand for purpose of making sand casting molds, the molasses is basically is the cane or blackstrap molasses, unrefined, and containing 60 to 70% sugar solids. The molasses can be used for improving the dry strength of the sand.

In accordance with the present disclosure, the bentonite (calcium based) used as an additive for preparing the sand for purpose of making sand casting molds, the bentonite (calcium based) is an inorganic calcium bentonite which also known as no swelling bentonite. It is typically found in ceramic, tan, bluish or gray color in powdered form. Its purpose is to basically bond in the green sand system, to promote good green strength, moderate dry and hot compression strengths. It gives higher green, lower dry and hot strengths and promotes better flowability than western bentonite.

In accordance with the present disclosure, the bentonite (sodium based) used as an additive for preparing the sand for purpose of making sand casting molds, the bentonite (sodium based) is an inorganic sodium bentonite also known as high swelling bentonite. It is typically found in bluish, cream, gray or light yellow color in powdered form. Its purpose is to basically bond in the green sand system, to promote green, dry and hot compression strengths. To prevent erosion, cuts, washes and allow for silica sand expansion.

In accordance with the present disclosure, the fireclay used as an additive for preparing the sand for purpose of making sand casting molds, the fireclay is an inorganic material typically gray in color having size 50 mesh. Its basic purpose is to bond in the green sand system, to increase green, dry and hot strengths. It is used particularly to increase dry and hot properties.

In accordance with the present disclosure, the kaolin clay used as an additive for preparing the sand for purpose of making sand casting molds, the kaolin clay is an inorganic material typically gray in color also called "china clay". Its purpose is to primarily increase dry and hot compression strengths.

In accordance with the present disclosure, the asphalt used as an additive for preparing the sand for purpose of making sand casting molds, the asphalt is an organic powdered material typically brown or black in color. Its purpose is to improve casting finish and control mold atmosphere. It is a replacement or supplement for sea coal or pitch.

In accordance with the present disclosure, the lamp black used as an additive for preparing the sand for purpose of making sand casting molds, the lamp black is an organic material which is extremely fine and pure carbon. It is typically black in color and is found in powered form. Its purpose is to improve casting peel and finish.

In accordance with the present disclosure, the cellulose used as an additive for preparing the sand for purpose of making sand casting molds, the cellulose is added to control sand expansion and to broaden the allowable water content range. It is usually added in the form of wood flour, or nut shells. Cellulose reduces hot compressive strength and provides good collapsibility, thus improving shakeout. At high temperatures, it forms soot, which deposits at the mold/metal interface and resists wetting by metal or slags. It also improves the flowability of the sand during molding.

In accordance with the present disclosure, the cob flour used as an additive for preparing the sand for purpose of making sand casting molds, the cob flour is an organic material typically yellow or reddish brown in color. It is found in the form of ground corn cobs. It is used to reduce sand expansion defects and improve shakeout. It acts as a cushioning material and improves sand flowability.

In accordance with the present disclosure, the furfural residue used as an additive for preparing the sand for purpose of making sand casting molds, the furfural residue is an organic material, typically dark brown in color. Its purpose is to reduce sand expansion defects and improve shakeout. It acts as a cushioning material.

In accordance with the present disclosure, the oat hulls used as an additive for preparing the sand for purpose of making sand casting molds, the oat hulls is an organic material usually found in powdered form in yellow or brown colorist purpose is to reduce sand expansion defects and improve shakeout. It acts as a cushioning material and improves sand flowability.

In accordance with the present disclosure, the walnut shell flour used as an additive for preparing the sand for purpose of making sand casting molds, the walnut shell flour is an organic material, tan in color. Its purpose is to reduce sand expansion defects and improve shakeout. It acts as a cushioning material.

In accordance with the present disclosure, the asphalt emulsion used as an additive for preparing the sand for purpose of making sand casting molds, the asphalt emulsion is an inorganic material. It contains asphalt bitumen, water and a suitable emulsifying agent. It improves casting peel and finish. It can be used as a replacement or supplement for sea coal.

In accordance with the present disclosure, the kerosene used as an additive for preparing the sand for purpose of making sand casting molds, the kerosene is an organic material. It is hydrocarbon oil and by-product of petroleum distillation. Its purpose is to increase amount of volatiles, add lubricity and keep sand moist for longer.

In accordance with the present disclosure, the soda ash used as an additive for preparing the sand for purpose of making sand casting molds, the soda ash is an inorganic material having properties of sodium carbonate ($Na_2Co_3$). It is typically white in color having hygroscopic properties in powdered form. Its purpose is to control the pH level.

In accordance with the present disclosure, the wetting agent used as an additive for preparing the sand for purpose of making sand casting molds, the wetting agent is an inorganic material, having color and characteristics that that vary depending on type and source of supply. This agent promotes spreading of a liquid over a solid; it therefore has a property of reducing the contact angle to a value of zero. Its purpose is to reduce the surface tension of water to such a point that temper water will spread and penetrate the material to be wetted to a far greater extent and in a faster time than that is possible with regular water.

In accordance with the present disclosure, the alumina used as an additive for preparing the sand for purpose of making sand casting molds, the alumina is an inorganic material ($Al_2O_3$), having claimed alumina characteristics. It is typically white in color its purpose is to increase sand mixture refractoriness.

In accordance with the present disclosure, the chromite flour used as an additive for preparing the sand for purpose of making sand casting molds, the chromite flour is an inorganic material, typically dark brown or black in color. Its purpose is to reduce metal penetration and improve surface finish.

In accordance with the present disclosure, the fly ash used as an additive for preparing the sand for purpose of making sand casting molds, the fly ash is an inorganic material, typically gray in color; its purpose is to increase flowability.

In accordance with the present disclosure, the olivine flour used as an additive for preparing the sand for purpose of making sand casting molds, the olivine flour is an inorganic material, typically green in color. Its purpose is to reduce or eliminate metal penetration and improve casting finish.

In accordance with the present disclosure, the staurolite flour used as an additive for preparing the sand for purpose of making sand casting molds, the staurolite flour is an inorganic material, typically reddish brown in color. Its purpose is to increase hot plasticity and reduce or eliminate veining.

In accordance with the present disclosure, the zircon flour used as an additive for preparing the sand for purpose of making sand casting molds, the zircon flour is an inorganic material, typically white or tan in color, having claimed characteristics. Its purpose is to increase sand mix refractoriness, reduce or eliminate metal penetration and improve casting surface finish.

In accordance with the present disclosure, the bran flour used as an additive for preparing the sand for purpose of making sand casting molds, the bran flour is an organic material cereal binder. It works as a green strength additive.

In accordance with the present disclosure, the british gum used as an additive for preparing the sand for purpose of making sand casting molds, the british gum is an organic material, typically light or dark brown in color. It is a form of dextrin that has high tack characteristics. It acts as a bonding agent in green sand molding with a wide range of properties.

In accordance with the present disclosure, the lignin sulfate used as an additive for preparing the sand for purpose of making sand casting molds, the lignin sulfate is an organic material, it is light brown in color if dried (in powdered form). It is a sulfite pulp which is a byproduct binder of sulfite eye/lignin liquor. It is a dark liquid having 60-70% solids. It acts as a binder for clay materials and surface hardener for oil sand cores. In accordance with the present disclosure, the sodium silicate used as an additive for preparing the sand for purpose of making sand casting molds, the sodium silicate is an inorganic material, which is clear in liquid form and powdered form can contain 0-17% h2o. It is a viscous liquid which when mixed with powdered fireclay forms a refractory cement compositions of sodium oxide and silica in varying proportions. It acts as a secondary binder in clay bonded sand, reduces brittleness and friability in molding sand mixtures.

In accordance with the present disclosure, the wheat flour used as an additive for preparing the sand for purpose of making sand casting molds, the wheat flour an organic cereal binder, typically used to enhance GCS and reduce the importance of each parameter on the rejection type. Positive sign indicates a direct correlation and a negative sign indicates an inverse correlation between the parameters and the rejection. In order to reduce rejections therefore, the action recommended is to control the relevant parameter by taking the opposite action to the (+)/(−) signs.

Based on the above heat map for individual rejection type following changes recommended:
For rejection control the effect of inert fines weightage can be only −4.59 as by this increase most other defects with (−) sign all get covered.
Active clay weightage is −4.13 and therefore has to be increased.
Permeability is +4.06 and therefore has to be decreased. Increase in inert fines and active clay will automatically reduce permeability.
Moisture is +2.24 and therefore has to be reduced as all the analyzed defects demand moisture reduction.
GFN No is +2.45 and has to be decreased.
Volatile Matter—−1.78—All rejection type demand increase in Volatile Matter and decrease in LOI
GCS is—1.27—When active clay increase & GFN reduces, GCS will increases automatically
WTS is—Problematic as one defect demand (−0.75) and other (+0.38). Better not to change
Compactability is more prominently to be reduced
The rejections corresponding to the heat map using the methodology significant parameter predictor 900 as illustrated in FIGS. 9(*a*) to 9(*d*) is tabulated in TABLE-Ill.

TABLE III

Rejection wise HEAT MAP
SIGNIFICANT PARAMETER WAITAGE VALUES

| Sr No | Sand Parameter | Blow Hole Foundry Stage | Broken Mould | Expansion Scab | Pinhole Foundry Stage | Sand Drop/Inclusion Foundry | Uncategorised | Summary | Total Rejection- Heat map |
|---|---|---|---|---|---|---|---|---|---|
| 1 | Inert Fines | −1.46 | −0.1 | 0.63 | −4.59 | −4.03 | 0.26 | −9.29 | −9.29 |
| 2 | Active Clay | −0.6 | 0.08 | 0.76 | −3.89 | −4.13 | 0.17 | −7.61 | −7.61 |
| 3 | Permiability | 4.06 | 0.17 | −0.31 | 1.86 | 1.7 | −0.09 | 7.39 | 7.39 |
| 4 | Moisture | 0.92 | 0.17 | 0.04 | 2.53 | 0.28 | 0.23 | 4.17 | 4.17 |
| 5 | LOI | −0.39 | −0.14 | 0.49 | 2.24 | 0.68 | 0.03 | 2.91 | 2.91 |
| 6 | GFN | 2.45 | 0.18 | 0.27 | −0.76 | −0.05 | −0.06 | 2.03 | 2.03 |
| 7 | VM | −0.33 | 0.13 | −0.11 | −1.78 | −0.01 | 0.18 | −1.92 | −1.92 |
| 8 | GCS | −0.13 | 0.19 | 0.08 | −1.27 | −0.5 | 0.05 | −1.58 | −1.58 |
| 9 | WTS | 0.25 | −0.28 | −0.75 | 0.38 | 0.36 | −0.19 | −0.23 | −0.23 |
| 10 | Compactibility | −0.18 | −0.02 | 0.27 | 0.85 | 0.13 | −0.06 | 0.99 | 0.99 | expansion of the sand without increase in the deformation. It increases permeability but also increases gas formation.

In accordance with the present disclosure, FIG. 13 illustrates a second case study showing co-relation between heat map 1300 for individual rejection type vis a vis rejection type for total sand rejection based on historical data related to the computer implemented system 100 for optimization of sand for the purpose of reducing casting rejections in a foundry of FIG. 1. The heat map 1300 includes a heat map for total sand rejection quantity 1310, a heat map for blow hole foundry stage rejection 1320, a heat map for broken mould rejection 1330, a heat map for expansion scab rejection 1340, a heat map for pin hole foundry stage rejection 1350, a heat map for sand dry/inclusion foundry stage rejection 1360 and a heat map for uncategorized sand rejection 1370. The numeric values present in all the aforementioned shown in percentage. The parameters are arranged in the decreasing order of their influence on the rejection type. The values of the parameters represent the As the heat map based on total rejection is the summation of weightage of all the above six individual rejection values, in effect only the highest appearing weightage of any individual parameter needs to be neutralized by initiating an inverse action (increase or decrease) the relevant parameter based on defining (+)/(−) sign to achieve reduction in rejection as validated in the first case study.

On a futuristic development note the above matrix is proposed to be the starting point for achieving multi-parameter to multi-rejection co-relation. The system of the present disclosure is enabled to develop prediction modules to show the effect of change in one or multi parameters on multi selected rejection types, thereby enabling the foundry user to target and control specific rejection type.

TECHNICAL ADVANTAGES

The technical advantages envisaged by the present disclosure include the optimization of the sand parameters relating to the casting rejections using a computer implemented system.

The present disclosure provides a computer implemented system for reducing casting rejections or casting defects.

The present disclosure provides a system for predicting optimization of sand for the purpose of reducing rejections in a foundry.

The present disclosure provides a system for prescribing optimization of sand for the purpose of reducing rejections in a foundry.

The present disclosure provides a system for predicting optimization green sand/returned sand/recycled sand for the purpose of reducing rejections in a foundry.

The present disclosure provides a system for predicting optimization green sand/returned sand/recycled sand for the purpose of reducing rejections and re-utilization of the used sand in a foundry.

The present disclosure provides a system that is enabled receive a single point of entry for all the data elements purported to be used for various analytics.

The present disclosure provides a system that presents a consolidated view of various analytics in a multidimensional curve.

The present disclosure provides a self-learning system that automatically learns and updates itself.

The present disclosure provides a system that enables a foundry person to build computerized model with the desired parameter values.

The present disclosure provides a system that can be accessed online from anywhere and at any given time via a computer network.

The present disclosure provides a subscription based system to be used by the foundry user.

The present disclosure provides a secure and a reliable system.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, product, item, materials or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

Wherever a range of values is specified, a value up to 10% below and above the lowest and highest numerical value respectively, of the specified range, is included in the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A computer implemented system for optimization of sand for reducing casting rejections in a foundry, said system comprising:

a first repository configured to store therein data pertaining to a set of primary sand parameters, wherein said primary sand parameters is are selected from the group consisting of Green Compression Strength (GCS), compact-ability index, moisture content, active clay, inert fines content, Loss On Ignition percent (LOI), permeability index, wet tensile strength, volatile matter content, grain fineness number (GFN), American Foundry Society grain fineness number (AFS), oolitics content and pH value of the sand;

a second repository configured to store therein data pertaining to rejection type and rejection quantity of the castings;

a third repository configured to store therein pattern generated using the primary sand parameters corresponding to the casting rejections;

an input module cooperating with said first repository, said input module configured to receive at least a value corresponding to at least one primary sand parameter for an instance;

a processor module cooperating with said first repository, said second repository, said third repository and said input module, said processor module configured to correlate primary sand parameter values, the primary sand parameters, the casting rejections, and the rejection type, and provide correlation between the primary sand parameter values, the primary sand parameters, the casting rejections, and the rejection type for the instance;

a pattern forming engine coupled with the processor module, said pattern forming engine configured to store a set of pattern forming rules, said pattern forming engine configured to apply said pattern forming rules to determine at least a pattern based on the correlations of the primary sand parameter values, primary sand parameters, casting rejections, and rejection type, the pattern generated being at least a complex equation which takes into account each of the correlated data to form a complex multi-dimensional curve; and a predictive-prescriptive module cooperating with said pattern forming engine and said processor module, said predictive-prescriptive module configured to receive input values corresponding to the primary sand parameters fed by a user, said predictive-prescriptive module being configured to map the input values into the complex equations and generate at least a predictive/prescriptive solution including a degree of probability, wherein the predictive/prescriptive solution is utilized to adjust sand primary parameters; and a self-learning editor cooperating with said pattern forming engine and said predictive-prescriptive module, said self-learning editor configured to store each and every multi-dimensional curve generated into a temporary repository, determine predicted casting rejections and a rejection type present in the predictive/prescriptive solution and compare and correct predicted values corresponding to the casting rejections and the rejection type with actual rejections and rejection types inputted by the user.

2. The system as claimed in claim 1, wherein said first repository is further configured to store data pertaining to a secondary set of sand and related metal casting parameters for reducing sand related casting defects selected from the group consisting of shatter index, sand to metal ratio, dry composition strength, return sand temperature at the mixer, core sand infiltration, specimen weight, friability index, cone jolt test, shear strength, deformation, stickiness, green tensile strength, hot strength, flow-ability, mould hardness, toughness, density, sinter point, durability, mould-gas evolution, metal penetration, air-set strength, mouldability, sieve distribution, grain shape, bentonite content, M B value, gelling time, swelling capacity, and metal related parameters.

3. The system as claimed in claim 1, wherein said system further comprises a display module cooperating with said processor and said predictive-prescriptive module, said display module configured to display the predictive/prescriptive solution including a degree of probability and the correlated data which is graphically represented in a user readable format.

4. The system as claimed in claim 1, wherein said self-learning editor is configured to store and update corrected rejections and the rejection type present in the predictive/prescriptive solution into said third repository.

5. The system as claimed in claim 1, wherein said self-learning editor is configured to take an action related to a rejection of improbable rejections, wherein the action is selected from a group consisting of determining, retaining, discarding, updating and storing the improbable rejections into said third repository.

6. A method for predicting or prescribing optimization of sand for the purpose of reducing casting rejections in a foundry, said method comprising the steps of:
storing at a first repository, data pertaining to a set of primary sand parameters, wherein said primary sand parameters is are selected from the group consisting of Green Compression Strength (GCS), compact-ability index, moisture content, active clay, inert fines content, Loss On Ignition percent (LOI), permeability index, wet tensile strength, volatile matter content, grain fineness number (GFN (GFN), American Foundry Society grain fineness number (AFS), oolitics content and pH value of the prepared sand;
storing at a second repository, data pertaining to rejection type and rejection quantity of the castings;
storing at a third repository, pattern generated using the primary sand parameters corresponding to the casting rejections;
mapping of the casting rejections related to the parameters corresponding to the day of the casting process;
inputting a current set of input values corresponding to the primary sand parameters for an instance for which at least a prediction/prescription solution is desired;
correlating the current set of input values with primary sand parameter values stored in said first repository, rejection value and rejection types stored in said second repository and the pattern stored in said third repository, and providing correlation between the primary sand parameter values, the primary sand parameters, the casting rejections, and the rejection type for the instance;
storing a set of pattern forming rules in a pattern forming engine;
applying the pattern forming rules for determining at least a pattern based on the correlations of the primary sand parameter values, primary sand parameters, casting rejections, and rejection type;
deriving at least a multi-dimensional complex curve based on the pattern generated by processing at least a complex equation, wherein each of the multi-dimensional curve being a prescriptive/predictive solution to the pattern;
subsequently, fitting current values of parameters to the closest fit of the curve derived by processing and mapping the current set of input values corresponding to the primary sand parameters into the complex equation to obtain the predictive/prescriptive solution including a degree of probability;
determining predicted casting rejections and a rejection type present in the predictive/prescriptive solution and subsequently comparing and correcting the predicted values corresponding to the casting rejections and the rejection type with actual rejections and rejection types inputted by a user; and
adjusting sand primary parameters based on the prescriptive/predictive solution.

7. The method as claimed in claim 6, wherein the step of storing data pertaining to the primary sand parameters further includes a step of storing data pertaining to a secondary set of sand and related metal casting parameters for reducing sand related casting are selected from the group consisting of shatter index, sand to metal ratio, dry composition strength, return sand temperature at the mixer, core sand infiltration, specimen weight, friability index, cone jolt test, shear strength, deformation, stickiness, green tensile strength, hot strength, flow-ability, mould hardness, toughness, density, sinter point, durability, mould-gas evolution, metal penetration, air-set strength, mouldability, sieve distribution, grain shape, bentonite, M B value, gelling time, swelling capacity, and metal related parameters.

8. The method as claimed in claim 6, wherein the step of processing and fitting the complex equation to obtain the predictive/prescriptive rejection value further includes a step of displaying the predictive/prescriptive solution including the degree of probability and the correlated data which is graphically represented in a user readable format.

9. The method as claimed in claim 6, wherein the step of comparing and correcting the predicted values corresponding to the casting rejections and the rejection type with the actual rejections and rejection types input by the user further includes a step of storing and updating the corrected rejections and the rejection type present in the predictive/prescriptive solution into said third repository.

10. The method as claimed in claim 6, wherein the step of determining the predicted rejections and the rejection type present in the predictive/prescriptive solution further includes a step of taking an action related to rejection of improbable rejections, wherein the action is selected from a group consisting of determining, retaining, discarding, updating and storing improbable rejections into said third repository.

* * * * *

UNITED STATES PATENT AND TRADEMARK OFFICE
CERTIFICATE OF CORRECTION

PATENT NO. : 9,731,344 B2  
APPLICATION NO. : 14/653282  
DATED : August 15, 2017  
INVENTOR(S) : Deepak Chowdhary Page 1 of 1

It is certified that error appears in the above-identified patent and that said Letters Patent is hereby corrected as shown below:

In the Claims

At Column 40, Line 17 (Claim 1), delete "is".

At Column 40, Line 53 (Claim 1), delete "and".

At Column 41, Line 48 (Claim 6), "(GFN (GFN), American Foundry Society grain fineness number (AFS)" should be changed to --(GFN or AFS)--.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*